(12) United States Patent
Crawford, III et al.

(10) Patent No.: US 12,220,656 B1
(45) Date of Patent: Feb. 11, 2025

(54) REMOVABLE INNER FRAME ASSEMBLY FOR CLEAN ENVIRONMENTS

(71) Applicant: ThreeSquared Solutions L.L.C., Charlotte, NC (US)

(72) Inventors: James T. Crawford, III, Charlotte, NC (US); Edward W. Waters, Jr., Charlotte, NC (US); Christopher Jacobs, Charlotte, NC (US)

(73) Assignee: ThreeSquared Solutions L.L.C., Charlotte, NC (US)

( * ) Notice: Subject to any disclaimer, the term of this patent is extended or adjusted under 35 U.S.C. 154(b) by 0 days.

(21) Appl. No.: 18/826,471

(22) Filed: Sep. 6, 2024

Related U.S. Application Data

(60) Provisional application No. 63/569,253, filed on Mar. 25, 2024.

(51) Int. Cl.
 B01D 29/13 (2006.01)
(52) U.S. Cl.
 CPC .......... B01D 29/13 (2013.01); *B01D 2271/02* (2013.01); *B01D 2279/51* (2013.01)
(58) Field of Classification Search
 CPC . B01D 29/13; B01D 2271/02; B01D 2279/51
 See application file for complete search history.

(56) References Cited

U.S. PATENT DOCUMENTS

| | | |
|---|---|---|
| 2,869,694 A | 1/1959 | Breckheimer |
| 3,098,731 A | 7/1963 | Greene et al. |
| 3,781,258 A | 12/1973 | Kometani et al. |
| 4,082,525 A | 4/1978 | Allan |
| 4,233,044 A | 11/1980 | Allan |
| 4,368,676 A | 1/1983 | Henriksen et al. |
| 4,439,219 A | 3/1984 | Lambrecht |
| 4,568,401 A | 2/1986 | Davis |
| 4,586,602 A | 5/1986 | Levey |
| 4,639,261 A | 1/1987 | Pittman et al. |

(Continued)

FOREIGN PATENT DOCUMENTS

| | | |
|---|---|---|
| CN | 111503806 A | 8/2020 |
| GB | 2335975 A | 10/1999 |
| KR | 20190139367 A | 12/2019 |

OTHER PUBLICATIONS

Unravelling Polymers; The definitive blog on Polymers by Poly Fluoro Ltd Expanded PTFE 9ePTFE) Tapes—Properties and installation Techniques; Feb. 5, 2016 (Year: 2016).

*Primary Examiner* — Brian A McCaig
(74) *Attorney, Agent, or Firm* — Endurance Law Group PLC; James R. Yee

(57) ABSTRACT

A removable inner frame assembly for use with a filter element and a main frame includes an inner frame, a bottom sealant layer, and a top sealant layer. The filter element has a lower edge extending from an outer perimeter of the filter element. The inner frame has a plurality of U-shaped sides. The first end of each side is connected to a second end of another side. The bottom sealant layer is affixed to a bottom surface of the bottom of each side of the inner frame. The bottom sealant layer is configured to allow the removable inner frame assembly to be releasably coupled to the main frame. The top sealant layer is located within the u-shaped channel formed by each side of the inner frame and is configured to receive the lower edge of the filter element.

20 Claims, 32 Drawing Sheets

(56) References Cited

U.S. PATENT DOCUMENTS

| | | | |
|---|---|---|---|
| 4,900,342 A | 2/1990 | Spengler | |
| 4,946,484 A | 8/1990 | Monson et al. | |
| 4,961,762 A * | 10/1990 | Howeth | B01D 46/10 55/497 |
| 5,098,625 A | 3/1992 | Huang et al. | |
| 5,395,429 A | 3/1995 | Sutsko et al. | |
| 5,411,438 A | 5/1995 | White et al. | |
| 5,536,290 A | 7/1996 | Stark et al. | |
| 5,871,556 A | 2/1999 | Jeanseau et al. | |
| 5,993,311 A | 11/1999 | Feller et al. | |
| 6,267,793 B1 | 7/2001 | Gomez et al. | |
| 6,497,739 B2 | 12/2002 | McGill | |
| 6,858,055 B2 | 2/2005 | McGill | |
| 6,918,940 B1 | 7/2005 | Lackey et al. | |
| 7,323,028 B2 | 1/2008 | Simmons | |
| 8,048,186 B2 | 11/2011 | Mann et al. | |
| 8,066,843 B2 | 11/2011 | Ragsdale et al. | |
| 8,105,409 B2 | 1/2012 | Mann et al. | |
| 8,784,528 B2 | 7/2014 | Gorman | |
| 9,039,801 B2 | 5/2015 | Gorman | |
| 9,557,073 B2 | 1/2017 | Breed et al. | |
| 9,784,287 B2 | 10/2017 | Whittemore | |
| 10,393,074 B2 | 8/2019 | Schmid et al. | |
| 10,939,975 B2 | 3/2021 | Spencer et al. | |
| 11,280,504 B2 * | 3/2022 | Crawford, III | F24F 3/167 |
| 2005/0247105 A1 | 11/2005 | Dikken et al. | |
| 2006/0150596 A1 | 7/2006 | Takahashi et al. | |
| 2010/0105309 A1 | 4/2010 | Ishibashi | |
| 2014/0367023 A1 | 12/2014 | Hisano et al. | |
| 2017/0276400 A1 | 9/2017 | Hugues et al. | |
| 2017/0304758 A1 | 10/2017 | Dinakaran et al. | |
| 2019/0030382 A1 | 1/2019 | Roussos | |
| 2021/0252194 A1 | 8/2021 | Balaji et al. | |
| 2021/0364170 A1 * | 11/2021 | Crawford, III | F24F 3/167 |

* cited by examiner

Volatile Organic Compounds (VOC) by ATD GC-MS
Replacement page**

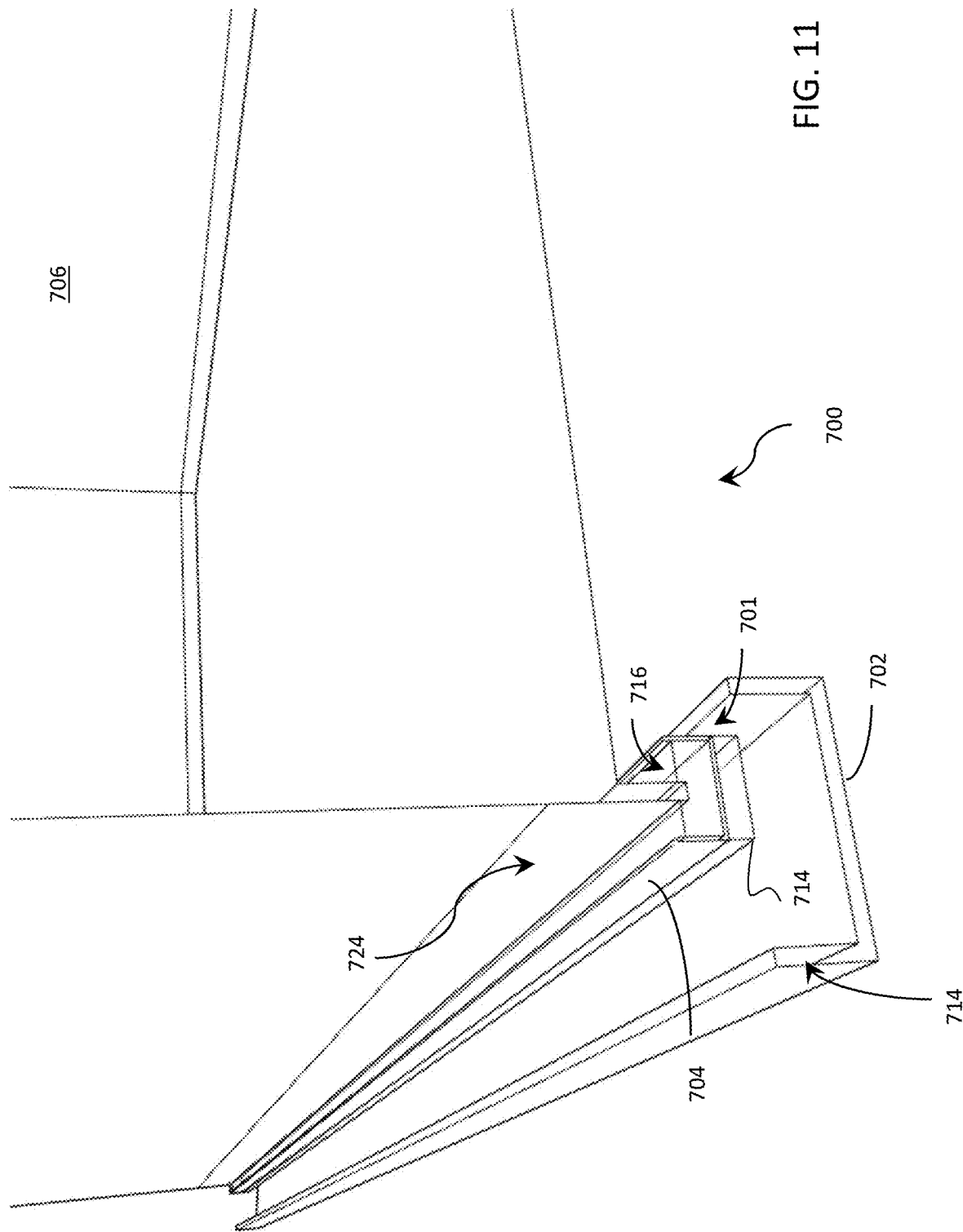

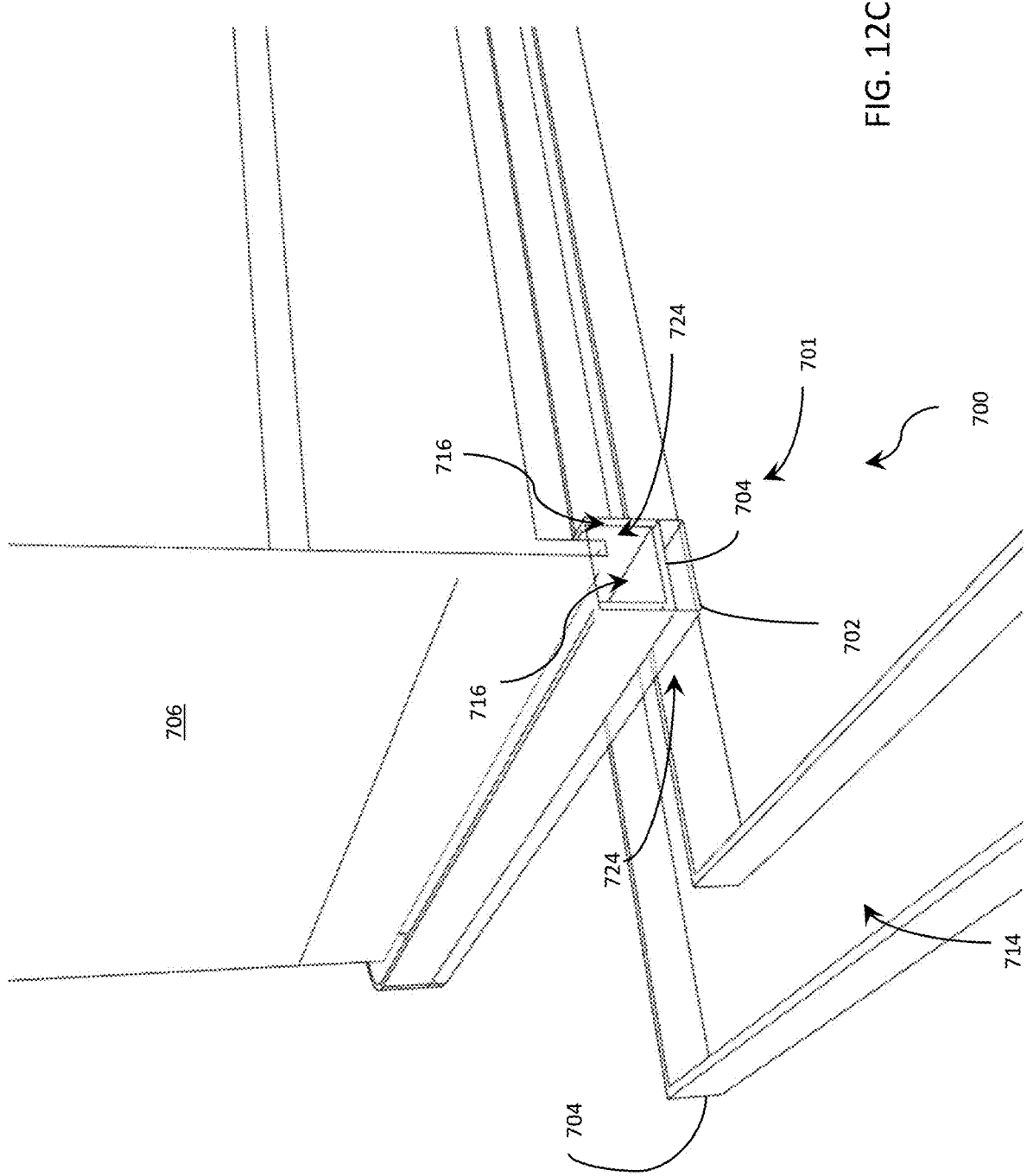

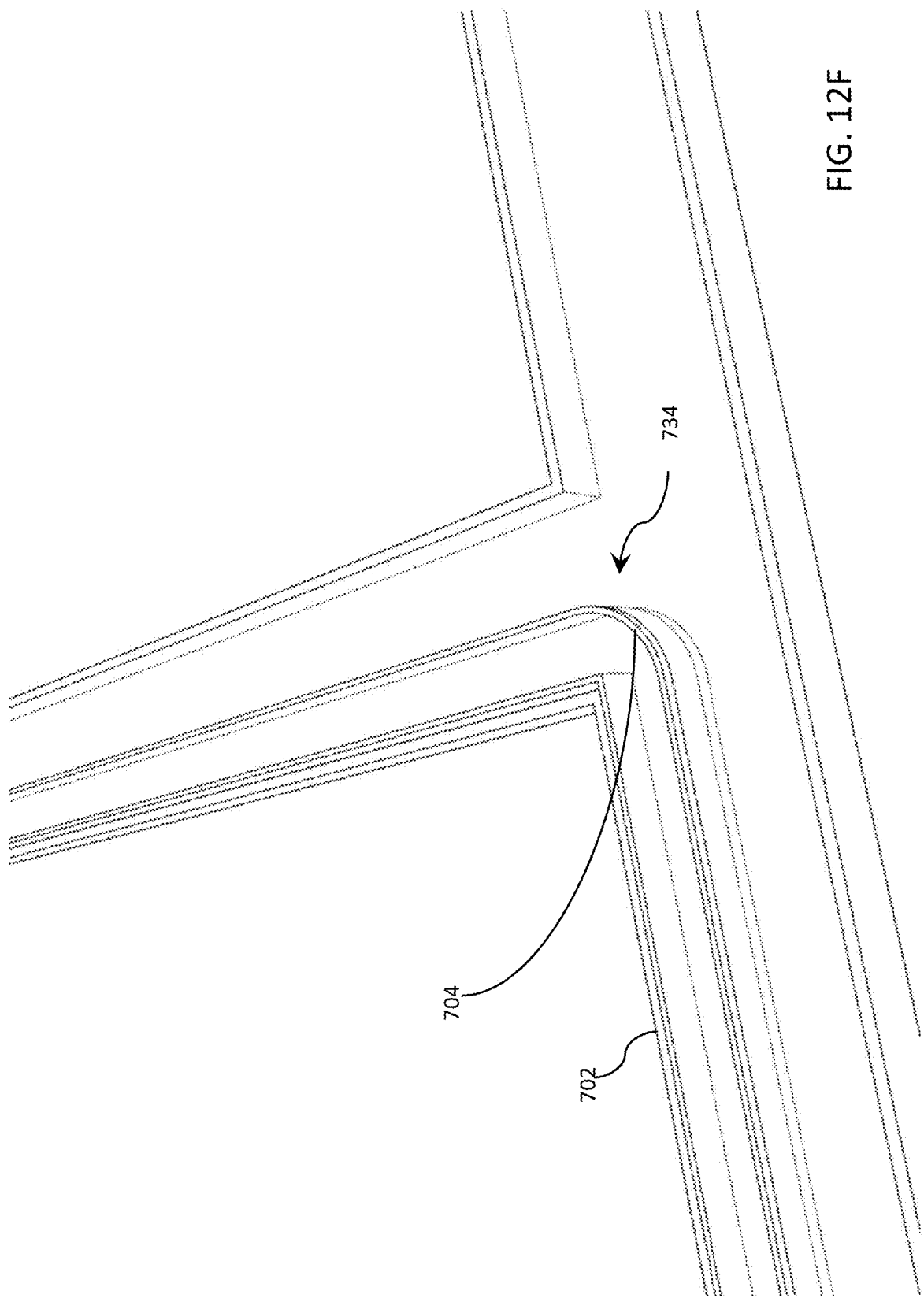

REMOVABLE INNER FRAME ASSEMBLY FOR CLEAN ENVIRONMENTS

CROSS REFERENCE TO RELATED APPLICATIONS

This application claims priority to U.S. Provisional Patent Application Ser. No. 63/569,253 filed on Mar. 25, 2024, the entire disclosure of which is hereby incorporated by reference and relied upon.

FIELD OF THE INVENTION

The present invention relates to the field of clean rooms, including electronic, pharmaceutical, chemical and medical clean rooms, medical clean rooms, permanent structures, temporary structures and modular cleans having filters built therein, and more particularly for compositions and materials improving the function, assembly, dismantling and reuse of the clean room structures.

BACKGROUND OF THE INVENTION

Clean rooms are highly sanitary rooms wherein manufacturing (especially electronic, chemical and pharmaceutical manufacturing) and medical treatments can be performed where high degrees of sterility are required and highly limited transmission of air carrying microbes into and possibly out of the clean room. Oftentimes, these clean rooms are used in emergency situations, as with the dramatic onset of the highly contagious COVID-19 virus. Clean rooms must be set up quickly, then the filters replaced as often as necessary (and even cleaned and replaced), and then disassembled to be moved to another location. The majority of cleanrooms in the world are large, fixed in place facilities used for the manufacturing of pharmaceuticals and or computer chips and many other types of manufactured parts, each at different levels of cleanliness. Although this product could be used in a modular room, the majority of the present invention systems, methods and materials would not be so used. Also, the room where the medical treatments are performed would usually be called operating theaters. The present inventive technology would work well there as well.

The more mobile clean rooms are somewhat modular, with frames with special structure to them allowing for different elements, especially the HEPA filters, to be secured and positioned with relatively air-tight seals between the filters and the fame to restrict any air seepage at the junctures. Because it can be disinfected many times with strong chemicals that would degrade the products presently used in clean rooms.

There are generally two methods used to install filters in a cleanroom grid system. Installations from the plenum interstitial side of the grid are referred to as "top load". Filters installed from the clean space side are termed "bottom load". The introduction of LDS (load distributing system or load drop system) gives either system a distinct advantage over current sealing methods, but they have different installation requirements. When applicable, a system of shims/guides may be employed to center the filter/knife edge on the LDS on all installation types.

One example of prior art efforts to create a portable clean-room is evidenced by Published US Patent Document 2017

Top Load Filter Installation

When a top load filter is installed from the plenum side of the grid, gravity exerts a force on the knife edge to penetrate the LDS. This may not be sufficient to form a seal, even with quality LDS materials, so an additional external force must be applied to form a sustainable seal. The filter must be centered on the UltraLDS™ low density PTFE sealant, and a tensioning kit is then installed on each end of the filter, usually across the longitudinal axis. The tensioning kit consists of springs on each side of the filter body, connected by a cable. The other end of the spring is attached to the grid system by a specifically designed anchor.

The installation of the tension kit is as follows, for a typical 2×4 HEPA/ULPA setup. The four spring anchors are attached to the filter grid, approximately 10 inches (25.4 cm) from the end of the filter. Opposing springs are attached to the anchors and tension applied by a custom spring tensioning device. When the springs are extended, a cable is installed between them, and the tension is released. The spring tension is transferred to the filter body via the cable, and a seal is established. Springs will also be useful to cancel or nullify any vibration or movement in the filters possibly causing the seal to be broken.

Components of the Tensioning System Kit (A) Grid Anchoring Hardware or "Saddle" for the Springs One variable in the installation of the tension kit is selection of the method of attaching the springs to the filter grid. Because of the wide variety of cleanroom filter grids, each anchoring method may have to be custom designed.

The anchor must meet the following criteria
 (1) Must be made of cleanroom compatible materials;
 (2) Attaching the anchor to the grid should be a simple and quick, using a minimum of tools;
 (3) The anchor must be able to withstand the spring tension for the life of the installation; and
 (4) The anchor must be constructed so that the spring can be easily attached to the anchor once installed.

(B) Springs

There are generally four springs in the kit, placed on each side of the filter body. (See FIG. 2)

The springs should meet the following criteria, which may vary somewhat based on the dimensions of the specific filter systems and clean rooms:
 (1) Must be made of stainless steel, or other cleanroom class compatible material, especially a metal of rigid polymer or reinforced polymer).
 (2) Should have hooks (or other latching connecting devices, such as an open-close coil loop) on at least one and even each end or at least one end that have the following criteria:
  (a) Constructed in such a manner that allows rapid installation of one end of the spring to the grid anchor.
  (b) The opposite end of the spring must be able to accommodate the tensioning device hook (or compatible connector), and a cable end loop. When tension is released from the spring, the tensioning hook must be simple to remove.
 (3) The two springs on each cable (and therefore at least 4 springs per filter, with two cables/filter) working in tandem under tension must provide enough downward force to maintain a sustainable seal. The springs must be capable of maintaining sufficient tension over the life of the installation and not be readily elastically deformable.
 (4) The length of the spring and its potential tension can be determined by the factory on a per installation basis.
 (5) There are grid systems that do not employ a knife edge (an extending ledge, lip or ridge) to form a seal. These systems use two flat surfaces, with the LDS placed in between them. The springs must develop enough force to form and then maintain a seal, often assisted by gravity.

(C) Cables

There is usually at least one cable in a tension kit, that is used to connect the two springs in an opposed set of springs and apply force to the filter body. The cable should meet the following criteria:

(1) Must be made of cleanroom compatible materials as mentioned above for the springs;

(2) Must be at least $\frac{1}{16}$ to $\frac{5}{16}^{th}$ inches in diameter, preferably between $\frac{2}{16}$ to $\frac{4}{16}$ inches in diameter;

(3) The end of each cable must be formed into a loop, not to exceed $\frac{5}{16}^{th}$ inches in diameter. The loop may be formed by mechanical clamping or locking;

(4) The total length of the cable under full tension tends to be a function of filter height/width, and spring length.

(5) The cable must be constructed in such a fashion that its design length is maintained over the life of the installation (again referencing resistance to elastic fatigue, permanent stretching, caused by weakening of the material forming the cable).

(D) Spring Tensioning Device

The use of a spring tensioning device is highly desirable if not required due to the unique operating environment. Very tight spaces require a unique tool (apparatus) that will be placed in between two filters that are only 1-inch apart. The apparatus is made to have two opposing arms that will fit into or on the ¼-inch 20 threaded track. This will allow the ratcheting mechanism to be positioned over the tensioning spring and then lowered having a hook type end, attach to the spring assembly which is attached to the filter grid via the Saddle and then be ratcheted to apply as much as 125 lbs of load with very little effort.

Bottom Load Filters

As the name implies, these filters are installed from the clean side of the grid (with the bottom of the filter facing, inward or outward from the room and how with respect to air flow through the filter). This device of the invention is designed to fit into the threaded groove where the saddle (grid anchoring hardware) is anchored to stabilize the device and system of the present invention and is made so that it can pull a load on the springs in a confined space of about 0.75 to 1.15 inches between two filters (with some larger variation allowed with different room or facility designs). Additionally, the ratcheting portion of the device needs to be able to pull a load of up to or greater than 100 pounds with no other leverage and only using the strength of a human hand. The ratcheting components must be constructed of materials allowing it to be used in a clean room. As in the Top Load filter, the gel/gasket track is replaced with LDS. This tends to work on top load filters bottom load filters are installed differently. On a bottom load filter the cable assembly would be attached to a spring that would then be treaded through a bolt and tightened to create the load necessary to seal the filter using LDS In a typical design, a threaded stud is welded near each corner of the plenum opening. The filter is held in place by a metal tab placed over the stud and bolted down. LDS requires a relatively constant pressure (preferably evenly distributed along the length of contact) in order to form a sustainable seal. The stock factory tab is to be replaced by a specially designed bracket that is application specific. The bracket fits over the existing stud, and has room for a spring to be placed on the stud, and a nut applied. As the nut is turned, the spring is compressed, forcing the bracket upward. This applies upward force to the filter, to form a seal.

The bracket is custom designed for each installation and must be capable of maintaining compression for the life of the installation. Springs are specified on a basis of the individual designs. All components of the system must be composed of cleanroom compatible materials. After compression is applied, there will be sufficient thread remaining on the stud to install a protective cover if needed.

Because of significant reported failures in the seals between joining elements, which have been primarily identified as failures of sealants recommended and used in joining structural framed elements to the filter elements, significant improvements in compositions used to seal junctions have been necessitated.

Teflon™ fluorinated tapes have been widely used in many fields for decades.

U.S. Pat. No. 4,368,676 (Henrickson) evidences a process and apparatus are described for collection of gases and particulates which arise during the feeding of an electric furnace, especially in the manufacture of phosphorus. The collection system for the gases and particulates includes novel explosion panels which are employed in an enclosure that contains the gases and particulates, and the use of such panels also in the ductwork and filter units that conveys and treats the gases and particulates from the enclosure. Teflon™ tapes are disclosed as closure materials.

U.S. Pat. No. 4,568,401 (Davis) discloses a method of making an electrical cable in which an inner electrical conductor is loosely carried within the interior of an outer sheath. The inner conductor has a length in excess of the length of the sheath such that the cable is better able to withstand stretching and bending without damage to the inner electrical conductor.

U.S. Pat. No. 4,586,602 (Levey) evidences a detonating cord transport package wherein detonating cord is installed on a plurality of separator-support members so as to provide crossover locations at frequent intervals at which crossover locations there is incorporated means for stopping any detonation that occurs, with the result that such detonation will be confined to a relatively short length of detonating cord and will also be confined to the container in which the detonating cord transport package is disposed. Teflon™ tape is used as wrapping.

Published US Patent Application Document No. 20170304758 (Dinakaran et al.) evidences filtration systems, filters, and corresponding methods of installing and using a clean room filter. A filtration system may include a housing defining a vent opening and a filter opening. The housing may include a knife edge disposed about a perimeter of the filter opening and configured to extend downwardly. The filtration system may include a filter removably attached to the housing. The filter may include a frame having an opening and a channel disposed about a perimeter of the opening. The filter may further include a filter substrate disposed in the opening of the frame, a gasket disposed about a perimeter of the opening within the channel, and an adhesive compound disposed within the channel between the gasket and the channel. The filter may be configured to engage the knife edge of the housing, such that air may be configured to pass between the clean room and a duct via the filter. Teflon™ tape gaskets are used.

In some situations, the filter may need to be removed and replaced or reinstalled. For example, over time, the gel and/or tape may deteriorate and need to be replaced and/or the filters themselves may need to be removed and/or replaced. In some prior art systems, if a filter element is removed by simply lifting the filter out of the LDS (and then replaced or re-inserted), the integrity of the seal formed with the LDS may be affected or degraded. If the filter is then placed back in the frame or replaced, the seal between the filter and the LDS may not be effective or sufficient to reseal the filter.

The present invention is aimed at one or more of the problems identified above.

SUMMARY OF THE INVENTION

A filter frame may be configured to be used in a clean room environment(s).

In one aspect of the present invention, a sealant layer configured to be applied to an inner frame associated with a filter element and a main frame is provided. The inner frame has a plurality of sides and a bottom forming a u-shaped channel extending around an outer perimeter of the inner frame. The sealant layer includes a substrate and a sealant embedded within the substrate. The bottom sealant layer is configured to be affixed to a bottom surface of the bottom of the inner frame. The bottom sealant layer is configured to allow the inner frame to be releasably coupled to the main frame.

In another aspect of the present invention, a removable inner frame assembly for use with a filter element and a main frame is provided. The filter element has a lower edge extending from an outer perimeter of the filter element. The removable inner frame assembly includes an inner frame, a bottom sealant layer and a top sealant layer. The inner frame has a plurality of sides. Each side have a first end and a second end. The first end of each side is connected to a second end of another side. Each side has a pair of opposing legs extending from a bottom forming a u-shaped channel extending around an outer perimeter of the removable inner frame assembly. The bottom sealant layer is affixed to a bottom surface of the bottom of each side of the inner frame. The bottom sealant layer is configured to allow the removable inner frame assembly to be releasably coupled to the main frame. The top sealant layer is located within the u-shaped channel formed by each side of the inner frame. The top sealant layer is configured to receive the lower edge of the filter element.

In still another aspect of the present invention, a removable inner frame assembly for use with a filter element and a main frame is provided. The filter element has a lower edge extending from an outer perimeter of the filter element. The removable inner frame assembly includes an inner frame, a bottom sealant layer, a top sealant layer and a plurality of adjusting mechanisms. The inner frame has a plurality of sides. Each side has first end and a second end. The first end of each side is connected to a second end of another end. Each side has a pair of opposing legs extending from a bottom forming a u-shaped channel extending around an outer perimeter of the removable inner frame assembly. The bottom sealant layer is affixed to a bottom surface of the bottom of each side of the inner frame. The bottom sealant layer is configured to allow the removable inner frame assembly to be releasably coupled to the main frame. The bottom sealant layer includes a sealant and a substrate. The sealant is embedded within the substrate. The top sealant layer is located within the u-shaped channel formed by each side of the inner frame and is configured to receive the lower edge of the filter element. The plurality of adjusting mechanisms are associated with each pair of connected first and second ends and are configured to allow the connected first and second ends of adjacent sides of the inner frame to be adjusted. Each of the adjusting mechanisms includes a bracket having a first bracket end a second bracket end. The first bracket end is coupled to the first end of one of the sides of the inner frame. The second bracket end is coupled to the second end of another one of the sides of the inner frame. The first and second bracket ends of each bracket having at least one aperture. The bracket configured to be coupled to the sides of the inner frame by fasteners. The apertures on at least one of the first and second bracket ends are slot-shaped to allow the connected side of the inner frame to be adjusted relative to the adjacent side.

In still one more aspect of the present invention, a frame assembly for use with a filter element is provided. The filter element has a lower edge extending from an outer perimeter of the filter element. The frame assembly includes an inner frame, a main frame, a bottom sealant layer and a top sealant layer. The inner frame has a plurality of sides. Each side has a first end and a second end. The first end of each side is connected to a second end of another side. Each side has a pair of opposing legs extending from a bottom forming a u-shaped channel extending around an outer perimeter of the inner frame. The bottom sealant layer is affixed to a bottom surface of the bottom of each side of the inner frame. The bottom sealant layer is configured to allow the inner frame to be releasably coupled to the main frame. The main frame is configured to receive the inner frame. The inner frame is removably affixed to the main frame by the bottom sealant layer. The top sealant layer is located within the u-shaped channel formed by each side of the inner frame. The top sealant layer is configured to receive the lower edge of the filter element.

BRIEF DESCRIPTION OF THE DRAWINGS

FIG. 11 is a partial cross-sectional view of the frame assembly and a filter element of FIG. 7.

FIG. 12C is an exploded view of a main frame and removable inner frame assembly with a filter element.

FIG. 12F is a partial perspective view of a main frame and an inner frame.

DETAILED DESCRIPTION OF THE INVENTION

Figure 1:
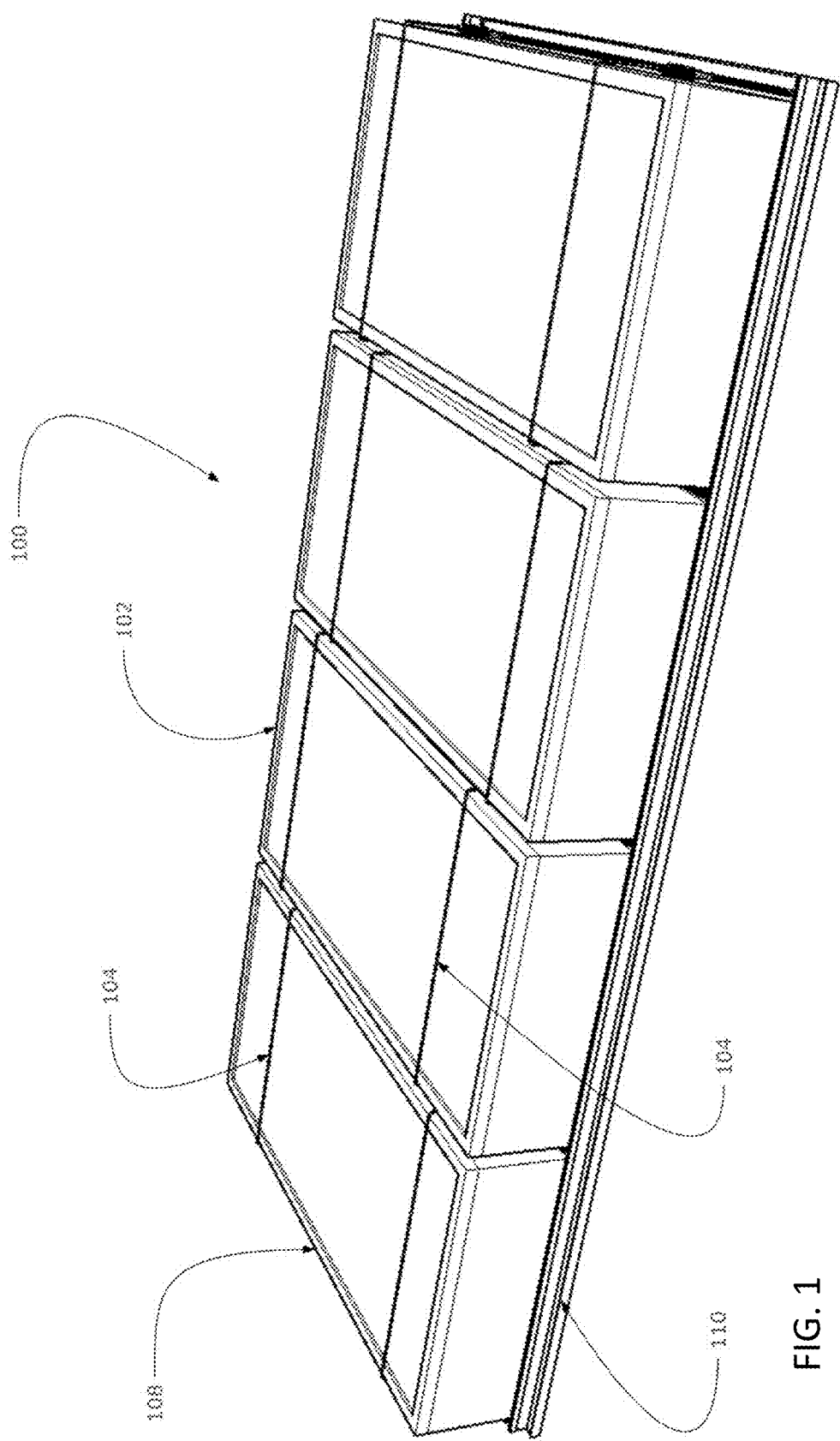
FIG. 1 is a perspective view of ceiling filter elements secured to a frame for use as part of a clean room.

With reference to the drawings and in operation, the present invention provides a filter frame 700 with a removable inner frame assembly 701 for use with one or more filter element 706. The filter frame 700 may be used within a clean room and for a method of constructing a clean room. All descriptions and variations used in describing the method may be applicable to the clean room itself, and visa versa.

In one aspect of the present invention, a system and a method for applying multiple filter elements into an air flow surface of a medically safe room and limiting air flow around sides of the filter elements including:

providing a frame that supports at least two adjacent filter elements having two pairs of opposed sides, one pair of opposed sides along its length and a second pair of opposed sides along its width;

the frame having at least one filter element separating support arms aligned to support adjacent filter elements;

the at least one filter element separating support arm separated by an orthogonal bracing arm;

the frame is formed with each filter element separating support arm being spaced between two adjacent filter elements, each filter element separating support having two parallel tracks separated by a raised panel extending the length of the two parallel tracks, and two parallel outside support arms are positioned at outer edges of the multiple filter elements, the two parallel outside support arms having at least one track with raised sides forming the at least one track;

each orthogonal bracing arm having at least one track with raised sides along a length of each at least one track;

the filter elements having four linear edges extending coplanar from sides of the filter elements along a bottom of each of the opposed sides of the filter elements with a width less than a width of a parallel track;

placing a tape of elastic ultralow density polytetrafluoroethylene polymer having a specific density of greater than 0.10, greater than 0.20 or equal to or greater than 0.25 and less than 0.6 along the length of the two parallel tracks in at least one opposed filter element separating support arm;

placing a tape of elastic ultralow density polytetrafluoroethylene polymer having a specific density of greater than 0.10, greater than 0.20 or equal to or greater than 0.25 and less than 0.6 along the length of the two parallel tracks in at least one opposed filter element separating support arm;

placing sealant that is limited or not (as herein defined) off gassing along the at least one track in the two outside support arms and along the length of the at least one track in each bracing arm;

inserting the four extending linear edges into each of the length of the two opposed filter element separating support arms and along the length of the at least one track in each bracing arm;

the four extending linear edges compressing and conforming the tape in the two parallel tracks in at least one opposed filter element separating support arm to form an effectively air tight seal along every track; and placing an elastically restraining cable on a face of each of the filter elements opposite to the four extending linear edges.

In the above method and system, the ultralow density polytetrafluoroethylene tape (often described hereinafter as the "ULDS tape") is used only on the most critical support arms between adjacent filter elements that have two tracks. It is also desired that the ULDP tape be applied on the two parallel outside support arms, as described herein. Additionally, it is more preferred when the ULDP tape is used in every track used to support individual and collective arrays of filter elements, including the tracks in the support arms between adjacent filter elements, the two parallel outside support arms and the orthogonal bracing arms. These ULDS tapes are also "non-gassing" tapes in that there is essentially little (less than 0.1% by weight, or even less than 0.05% by weight) to no low molecular weight materials (including solvents) that will emit from the polymer. Additionally, the invention is to replace existing technologies using a gel type product that cannot be cleaned, even with strong cleaning agents to kill a host of microbes, including bacteria, fungi, viruses and especially COVID-19, and other bad actors as well. In a pharmaceutical application, it is needed to wipe down all surfaces constantly and thoroughly. And the uniformly commercially used gels don't lend themselves chemically to that type of aggressive cleaning. Also, the present inventive technology comes out of a fully-ready container, such as bag, box, carton, package or the like, and is ready to install. On the other hand, gel has to be poured into the track and then there can be a set-up time for the gel, and the workers have to wait a day or more for it to cure before a filter can be placed into the track. Once the present technology ultralow density PTFE tape or ULDS molding strip is placed into the track, it can be used immediately for filter installation and use. The fact that there is no off-gassing from the ultralow density PTFE molding or tape further accelerates the ability to use the facilities and reduce deleterious, toxic or annoying odor in the work environment. Because of this case of use, the downtime in critical facilities is very minimal. To replace gel, it is necessary to close down that part of the plant or facility that needs the filter (and contemporarily) and the gel replaced, then workers have to remove all the gel (which may then be a hazardous waste). This takes many days depending on the number of filters. For example: 12 gel tracks filled with gel would take one week to scrape and prep the track then pour the gel and then still wait at least 24 hours for it to cure. The same process with the present technology using ULDS tape or molding would be 5-6 hours total.

A method is described for applying filter elements into an air flow surface of a medically safe room (other clean rooms may also benefit from this method and structure). The safe room or clean room limits air flow around sides of the filter elements, preventing ingress or egress of contaminated air from the room. The method provides a frame that supports at least two (this includes three, four or more filter elements) adjacent filter elements. The filter elements are usually in rectangular structures, with a main surface, an opposed surface, two opposed long sides and two opposed shorter sides. The filter element having two pairs of opposed sides (the long and shorter sides), one pair of sides along the length of the filter element and a second pair of sides along the width of the filter element. The frame having pairs of filter element separating support arms that are aligned to support adjacent filter elements. Support arms between adjacent filter elements will have two tracks, one each to engage with extensions off the filter elements that are inserted into the tracks, as later explained in greater detail. There are pairs of the support arms between adjacent filter elements will have two tracks pairs when there are at least three filter elements. When there are only two filter elements, there would be on a single filter element separating support arm. The filter element separating support arms are separated and structurally supported by orthogonal bracing arms.

Each filter element separating support arm is spaced between two adjacent filter elements having two parallel tracks separated by a raised panel extending the length of the two parallel tracks. The two parallel outside support arms (adjacent a long side of the filter elements at the ends of an array of multiple filter elements) have at least one track with raised sides. Each orthogonal bracing arm has at least one track with raised sides along a length of each at least one track. Only one track essential (a second is redundant) as these bracing arms may be supporting only a single filter element, while adjacent sides of the filter element separating support arm will support two adjacent filter elements.

The filter elements have four extending linear edges (these may be referred to as knife edges, edge extensions, extending arms or the like) along a bottom of each of the opposed sides of the filter elements with a width less than a width of a parallel track. As the filter elements are preferably rectangular, the four extending linear edges will also match the geometric shape of the filter element, and in the preferred case, also form a rectangle.

The method includes placing a tape of elastic ultralow density polytetrafluoroethylene polymer having a specific density of greater than 0.10, greater than 0.20 or equal to or greater than 0.25 and less than 0.6 along the length of two tracks in at least one opposed filter element separating support arm, along the at least one track in the two outside support arms and along the length of the at least one track in each bracing arm. The four extending linear edges are inserted into each of the length of the two opposed filter element separating support arms and along the length of the at least one track in each bracing arm.

The four extending linear edges compress and conform the tape to form an effectively air tight seal along every track; and The method fundamentally may conclude by placing an elastically restraining cable on a face of each of the filter elements opposite to the four extending linear edges.

The method may particularly use the elastic ultralow density polytetrafluoroethylene polymer has a specific density of greater than 0.10, greater or equal to 0.20, or greater than 0.30 and less than 0.55. The method includes installing the system that allows for applying and tightening restraining cables that are attached at opposite ends to tension springs secured in turn to a stable support element of the frame.

The tape is relatively thick for what is considered a tape, and is at least ⅜ inch up to 1.25 inches in thickness and width, with ¾-inch by ¾-inch being typical.

The method is preferably also practiced wherein a previous set of filter elements is first removed from the frame by lifting used filters off the frame, physically peeling exhausted elastic ultralow density polytetrafluoroethylene polymer out of all tracks, replacing exhausted tape with virgin elastic ultralow density polytetrafluoroethylene polymer tape, and then applying unused filters onto the frame and placing an elastically restraining cable on a face of each of the filter elements opposite to the four extending linear edges. An important aspect of the invention is the coherence of the described ultralow density PTFE tapes, which form the necessary air seal at contact points between the filter elements and the frame, is that the used tape on used filters can be physically stripped (even just peeled) off the tracks in the frame. The tape therefore appears to only lightly adhere to track surfaces, but rather merely conforms to the filter element extensions and the tracks to form an air seal, without adhering contact points so strongly that significant residue would remain on the surfaces of the track.

The method for replacing tarnished or exhausted filters is performed wherein a previous set of filter elements is first removed from the frame by lifting used filters off the frame, physically peeling exhausted elastic ultralow density polytetrafluoroethylene polymer out of all tracks, replacing exhausted tape with virgin elastic ultralow density polytetrafluoroethylene polymer tape, and then applying unused filters onto the frame and placing an elastically restraining cable on a face of each of the filter elements opposite to the four extending linear edges.

A clean room with a replaceable filter element system includes:
- a frame that supports at least two adjacent filter elements having two pairs of opposed sides one pair along its length and a second pair along its width;
- the frame having pairs of filter element separating support arms aligned to support adjacent filter elements;
- the pairs of filter element separating support arms separated by orthogonal bracing arms;
- each filter element separating support arm spaced between two adjacent filter elements having two parallel tracks separated by a raised panel extending the length of the two parallel tracks, and two parallel outside support arms having at least one track with raised sides;
- each orthogonal bracing arm having at least one track with raised sides along a length of each at least one track;
- the filter elements having four extending linear edges along a bottom of each of the opposed sides of the filter elements with a width less than a width of a parallel track;
- a tape of elastic ultralow density polytetrafluoroethylene polymer having a specific density of greater than 0.10, greater than 0.20 or greater than 0.25 and less than 0.6 positioned along the length of the two tracks in at least one opposed filter element separating support arm, along the at least one track in the two outside support arms and along the length of the at least one track in each bracing arm;
- the four extending linear edges inserted into each of the length of the two opposed filter element separating support arms and along the length of the at least one track in each bracing arm;
- the four extending linear edges having compressed and conformed the tape within the length of the two tracks in at least one opposed filter element separating support arm, along the at least one track in the two outside support arms and along the length of the at least one track in each bracing arm to form an effectively air tight seal along every track; and
- an elastically restraining cable on a face of each of the filter elements opposite to the four extending linear edges.

A review of the Figures will assist in a further understanding and appreciation of the details of the present invention.

FIG. 1 is a perspective view 100 of ceiling filter elements 112 secured to a frame 110 for use as part (in this case a ceiling or roof) of a clean room (not shown). About each filter element 112 is shown what is referred to as the long side 108 and the short side 102. Cables 104 used to maintain contact pressure between the filters 112 and the frame 110 are shown spaced apart on each filter element 112.

Figure 2:
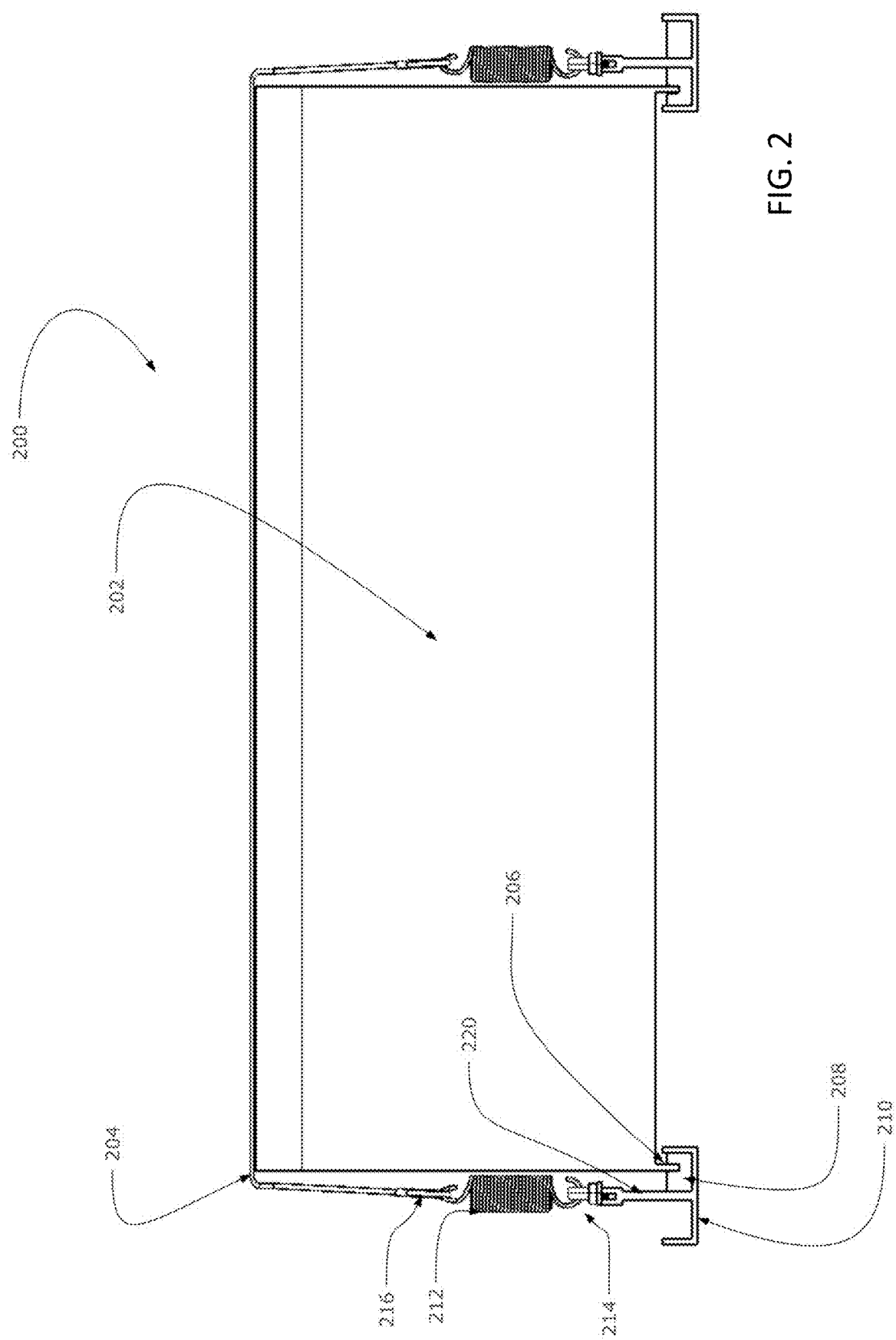
FIG. 2 is a side view of a filter element secured by a spring tensioned cable to each filter element separating support.

FIG. 2 is a side view 200 of a filter element 202 secured by a spring 212 tensioned cable 204 to each filter element separating support 210. The cables 204 are connected to the tensioning spring 212 through a physical connector such as a hook and loop 216 (or hook and eye, hook and holed plate, bolts, post and hole, etc., physical connectors). The tensioning spring 212 is connected to the filter element separating support 210 through a similar (but not necessarily identical physical connector 214 (here shown as a hook and hole bolted connector). One of the tracks or troughs in the filter element separating support 210 is shown with the tape 208 deformed by insertion of one of the four extending linear edges inserted into each of the length of the two opposed filter element separating support arms (here because of edge view of the length of the two opposed filter element separating support arms, only the end view of the filter element separating support 210 is seen). Element 220 is the raised separation plate between troughs in the filter element separating support 210.

Figure 3:
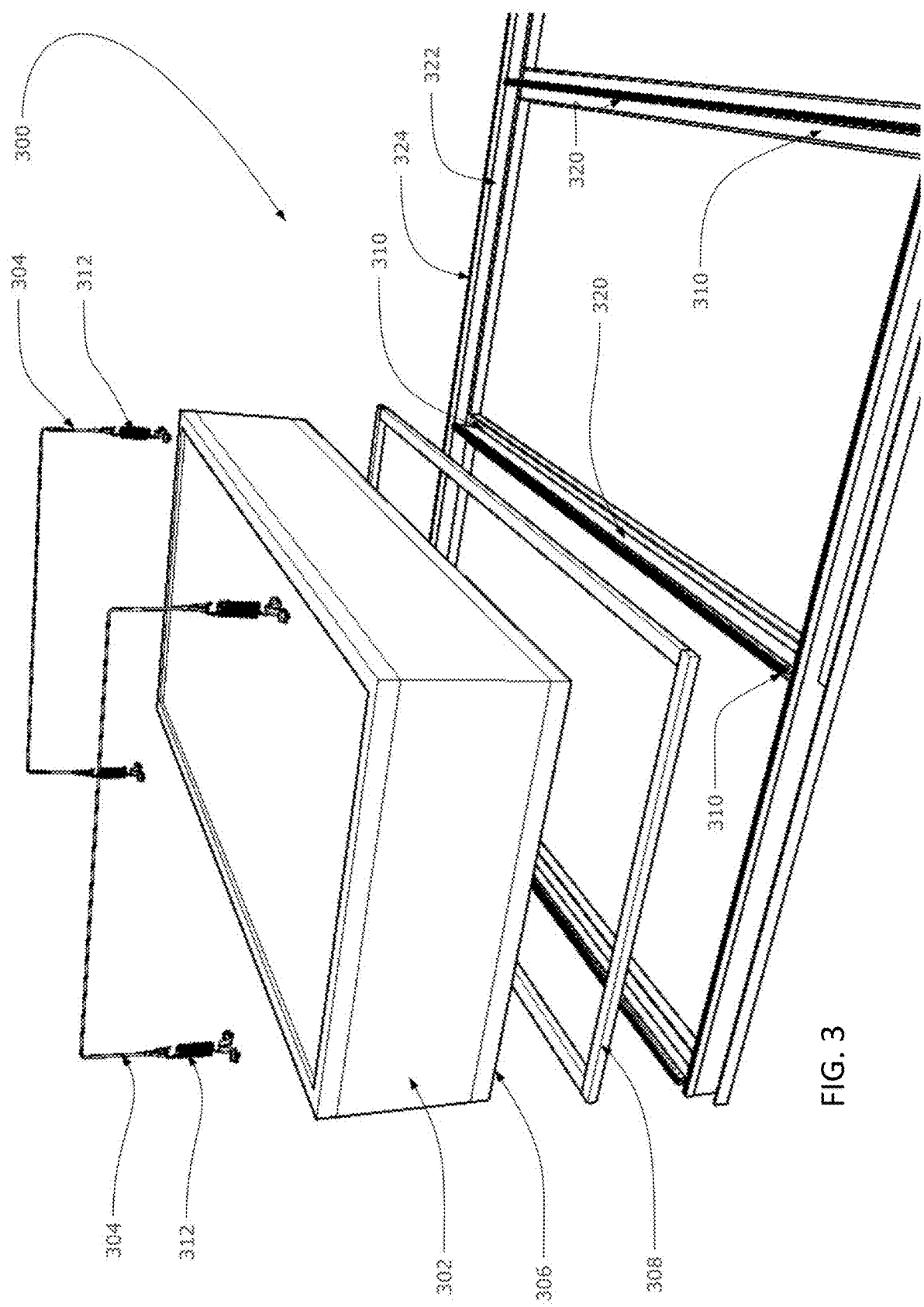
FIG. 3 is a perspective exploded view of tensioning cable supports, a filter element, four joined ULDS tape strips and a frame configured to support and connect two separate filter elements.

FIG. 3 is a perspective exploded view 300 of tensioning cable supports 304 with tensioning springs 312, a filter element 302, four joined ULDP tape strips 308 and a frame 322 configured to support and connect two separate filter elements 302 (only one shown). The frame 322 has troughs 310 separated by the raised separation plate 320. The tape 308 is seated onto the troughs 310 and the four extending linear edges are inserted into each of the length of the two opposed filter element separating support arms and the troughs 324 on the orthogonal support arms.

Figure 4:
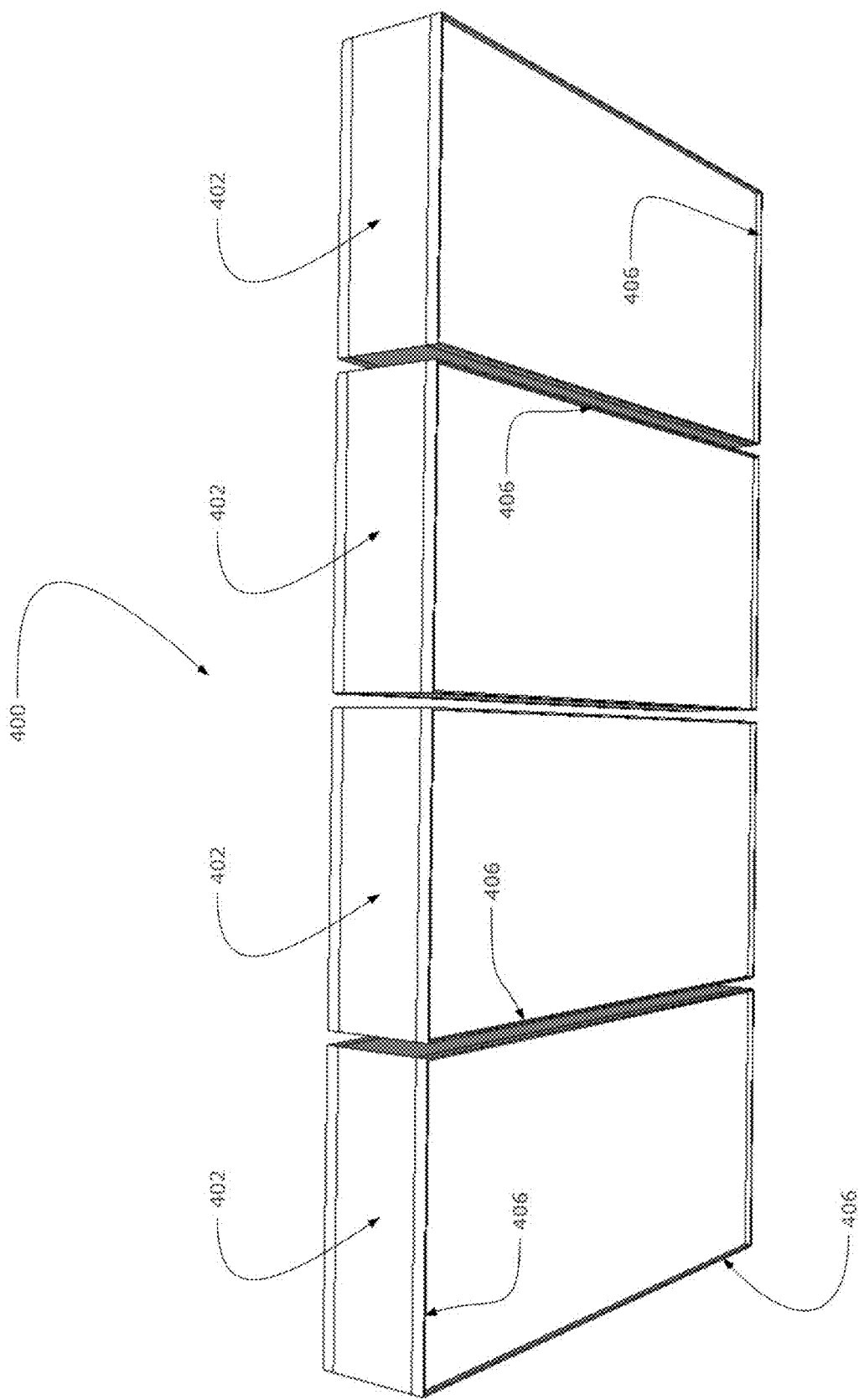
FIG. 4 is a perspective view of four unassembled filter elements.

FIG. 4 is a perspective view 400 of four unassembled filter elements 402. The four extending linear edges 406 are shown on each of the filter elements 402.

Figure 5:
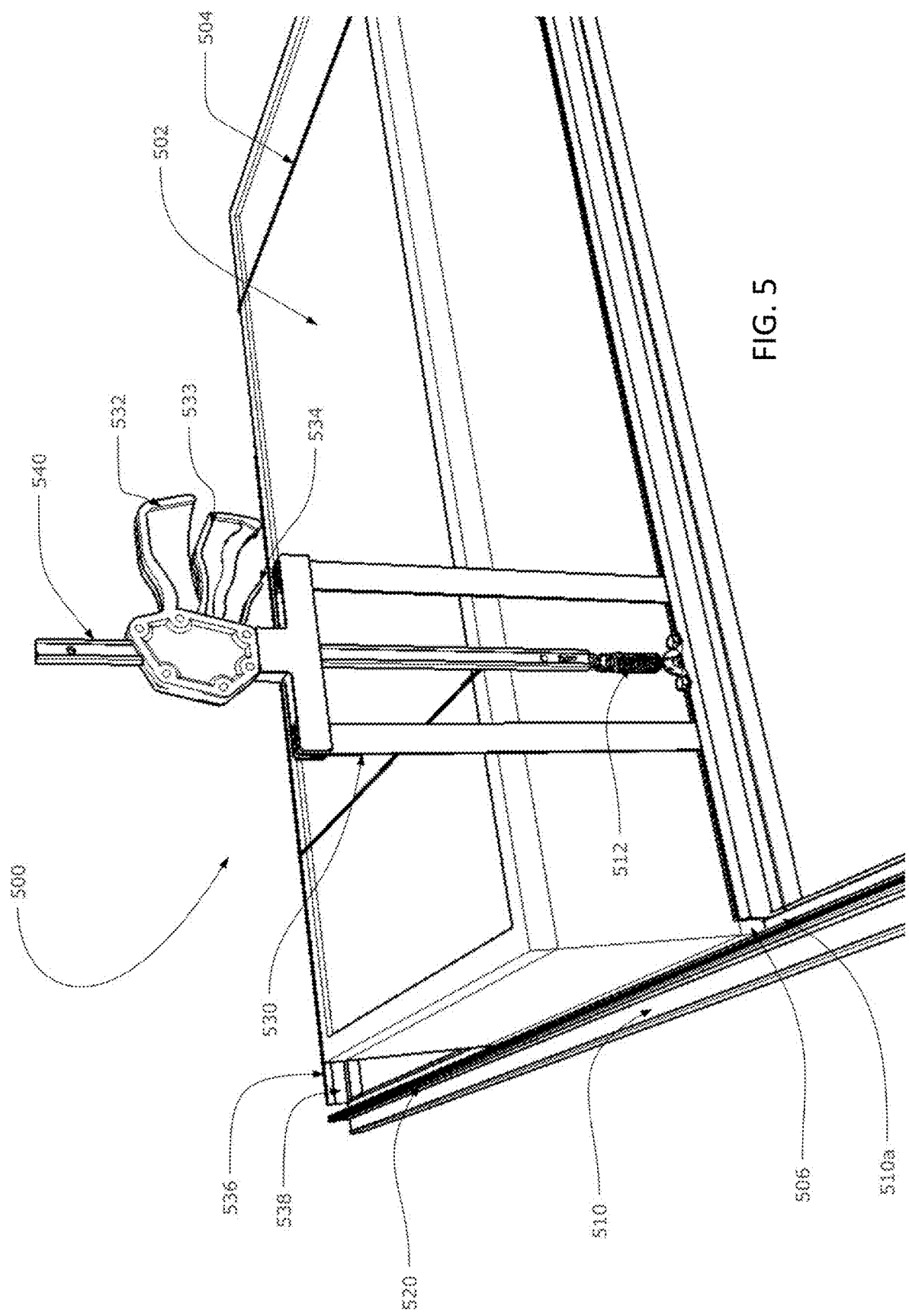
FIG. 5 is a perspective partial view of a ratcheting lifting system and/or cable attaching system for filter elements on frames.

FIG. 5 is a perspective partial view 500 of a ratcheting lifting system and/or cable attaching system for filter elements 502 on frames 536. The ratcheting system and other elements are addressed by the following key:
- 500 Filter under load and load transfer device
- 502 Filter body
- 504—Load transfer cable
- 506—Low Density Sealant
- 510—Gel Track with Low Density Sealant
- 510a—Gel Track with Low Density Sealant
- 512—Load Spring
- 520—¼" 20-Treaded track for installation of Saddle FIG. 2 (214)
- 530—Load installation stabilizer
- 532—Load Tensioner Handle grip
- 533—Load Tensioner ratcheting grip
- 540—Load Tensioning rod
- 534—Load Tensioning transfer release trigger.

The repeated squeezing of the load tensioner Handle grip 532 and the load tensioner ratcheting grip 533 ratchets the load installation stabilizer along the load tensioning rod. Although the troughs or tracks 510 and 510a are referred to as "gel tracks," this is merely previously existing structure into which the ULDP tapes are placed in the practice of the present invention.

As previously noted, other sealants may less preferably be used in the end support arm troughs or tracks 538 and the short side tracks or troughs 510a. If filter elements are put into an end-to-end (rather than or in addition to side-by-side) orientation, ULDP tape may be placed into tracks 510, 510a and 538.

The unique finding that ULDP tape may be used as the sealant is not only surprising, but the level of benefit and performance of the ULDP tape is unexpected.

Regular density (e.g., >7.0-1.50 specific gravity) materials are good sealants in other specialty areas, and even low-density polytetrafluoroethylene materials has limited use in other technical areas. For example, while chemical attack or extreme temperature might not leave any choice besides PTFE (these conditions are not present in medical clean rooms), there are some disadvantages to the material that could affect projects in other areas. Strong chemical disinfectants are prevalent in medical clean rooms. That product does not lend itself to temperatures above 600° F.

Higher Hardness

Virgin PTFE's hardness is 55 Shore D, which is much harder than a typical Nitrile O-Ring at 70 Shore A, which is a softer scale. The higher hardness negatively affects sealability, as the material doesn't conform the mating hardware surfaces as easily.

Leakage Rate

While rubber O-Rings might conform to "as machined" surfaces, standard PTFE sealants may require post-process surface finish improvements to control leakage to acceptable levels. This cannot be easily performed on the filter elements and frames discussed herein In general, under normal conditions, the leakage rate for a standard specific gravity and normal density PTFE O-Ring will be higher than any elastomeric compound, especially those used as sealants. These normal and generally better chemical classes of sealants include polyurethanes, polysiloxanes (and other silicone polymers), polyacrylates, synthetic rubbers and synthetic elastomers (e.g., typically ethylenically unsaturated monomer polymers such as isoprene, polybutadiene, acrylonitrile, styrene and the like).

The use of a PTFE O-Ring is therefore not generally recommended for applications that don't require extreme temperature or severe chemical conditions, which clean rooms do not.

Inelasticity

PTFE's nature as an inelastic material means that reuse or multiple installations of the same seal will not be possible. Unlike rubber compounds, PTFE will not return to its original shape and cross-section once deformed during installation and use. That means PTFE O-Rings or tapes or beads are typically only recommended for static face seal or flange type configurations that are not actively engaged and disengaged. This is in contrast to the replaceable connections for filters on clean room air flow systems which must be changed regularly and tend to be used in rapid assembly and rapid disassembly situations.

For example, a PTFE O-Ring or bead would not be recommended for a chamber door seal that needs to be opened and closed frequently, as the O-Ring would likely have to be replaced after every use.

A reused PTFE O-Ring or bead may look and perform similarly to a standard rubber O-Ring suffering from extreme compression set. But unlike rubber, this compression set occurs after only one use.

More often, PTFE O-Rings are found in flange gasket type applications where the seal will remain static and undisturbed until the next service interval.

It is surprising that the narrow class of ULDP tapes have been found to be useful in the attachments of filter elements to frames in clean room environments because of some of these properties that were considered deficiencies in other environments. For example, the fact that ULDP tapes permanently deform is acceptable in the clean room filter setting, as the filters are not frequently opened and closed or placed and removed, and when they are removed, they are always replaced. The non-adherent properties of ULDP tapes would be expected to reduce scaling quality, but because the tape readily deforms yet retains its structural integrity, the tape forms a good seal on the first insertion of the filter edge extensions (e.g., 306 in FIG. 3.

The non-adherence also allows for physical stripping or manual peeling of the tape when disassembly of the clean room or removal of the filter takes place. Minimal or no special cleaning (degreasing, scrubbing of decomposed polymer, sludge removal, solvent washes and the like) is seldom needed. No more than standard sanitation wiping (using 90% by weight or above of isopropyl alcohol) is typically necessary when changing filters.

ULDP tapes are commercially available from Three Square Solutions, Inc. as "UltraLDS™ ULDS tape. The dimensions of the tape should be at least 0.5 inches by 0.5 inches (1.25 cm×1.25 cm) in diameter, with the length selected according to dimensions of the filters and frames. Preferably the dimensions should be 1 inch by 1 inch (2.5×1.5 cm), 1.5×1.5 inches (3.8×3.8 cm), and variations of all dimensions between 0.5 inches (1.25 cm) and 6 inches (15.3 cm) useful. Tapes are also available from Technetics Group, a subsidiary of Enpro Industries Inc.

A Nov. 29, 2012 Bulletin (submitted with this Patent Document to the USPTO, and as with all documents cited herein, is incorporated in its entirety by reference) from Camfil™ clean air solutions discusses the complexity, difficulties and benefits of gel sealants (as are today used in attaching HEPA (high efficiency particulate arresters or air filters) in commercial environments, specifically discussing knife edge insertion into troughs containing gel (with both silicone and polyurethane gels discussed). Problems include oozing or spreading of the gels beyond desired limits in the devices or even outside the devices. The need for intensive cleaning of areas where the gel has been used, if those areas are to be used again, and the like.

The unique properties of ULDP tapes and their first time use in the field of the present invention sealing knife-edge connections between HEPA filters and gas-tight clean room and especially medical clean room environments has provided a long-sought need in the field. The ULDP tapes have been defined as PTFE (polytetrafluoroethylene) tapes, but copolymers of PTFE may also be used as long as the resulting polymer retains off-gassing and preferably non-stick, cohesive and chemically resistant, as is monomeric PTFE polymer.

In reviewing the graphic representations of tests for off-gassing, the following explanation of those figures will be helpful. The basis for both outgassing tests are the Intel protocols of 50 C for 30 min. As noted in the Outgassing Analysis Notes, the following are the same:

1) Retention time is +/−0.2 min
2) n-decane was used as a standard for both tests. The test detection limit is 0.1 ppmw (parts per million by weight) for both tests.
3) The amount of total outgassing includes all peaks detected.

The chromatograph, FIG. 2 on both reports, is a two dimensional x, y, graph. The horizontal x axis is the time at which a substance was detected, and a peak generated. The specific time a peak occurs identifies the substance. The vertical y axis, or area under the peak, is indicative of the amount of a specific substance present. On the graphs this referred to as abundance.

The SolidSeal™ gel chromatogram (page 5, FIG. 2) shows peaks so small they cannot be identified. The Total Outgassing Compounds (page 6, table 1) is 0.1 ppmw (parts per million by weight).

The WM Plastics product off-gasses a number of unfavorable compounds (table 1) 2200 times that of Solidseal™ gel. It becomes readily apparent when comparing the two reports that Solidseal™ gel is the superior product.

One aspect of the benefits of the present invention is clearly displayed in graphs comparing commercial materials and the materials used in the practice of the present invention.

Figure 6A:
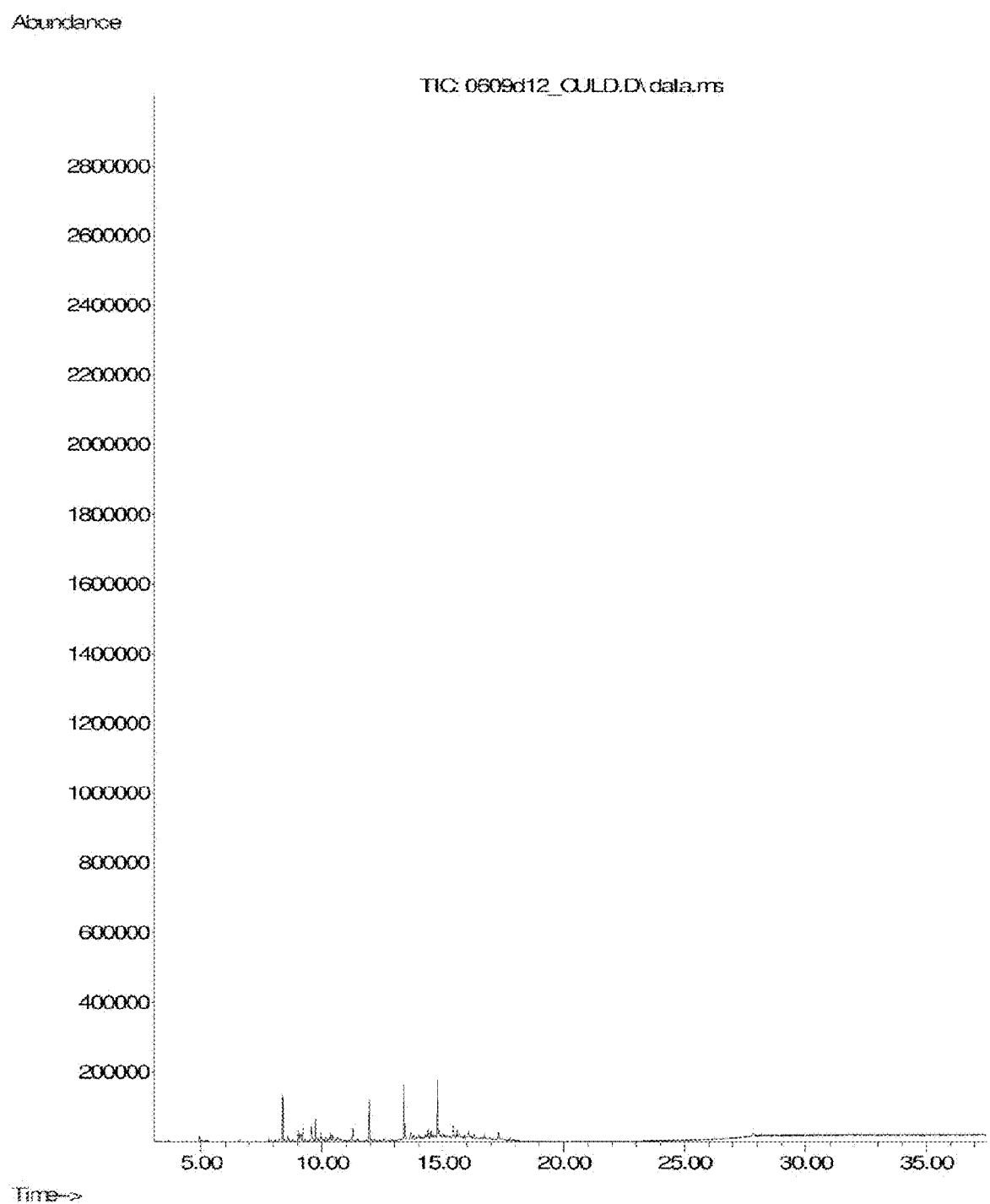
FIG. 6A is a chromatogram of a control run with no off-gassing materials present, showing progressive emission results for 35 minutes.

FIG. 6A is a chromatogram of a control run with no off-gassing materials present, showing progressive emission results for 35 minutes. There are zero recorded abundancies (off-gassed materials measured in units of parts per million by weight). There is a system meaningless display of less than 200,000 ppmw at 26+ minutes.

Figure 6B:
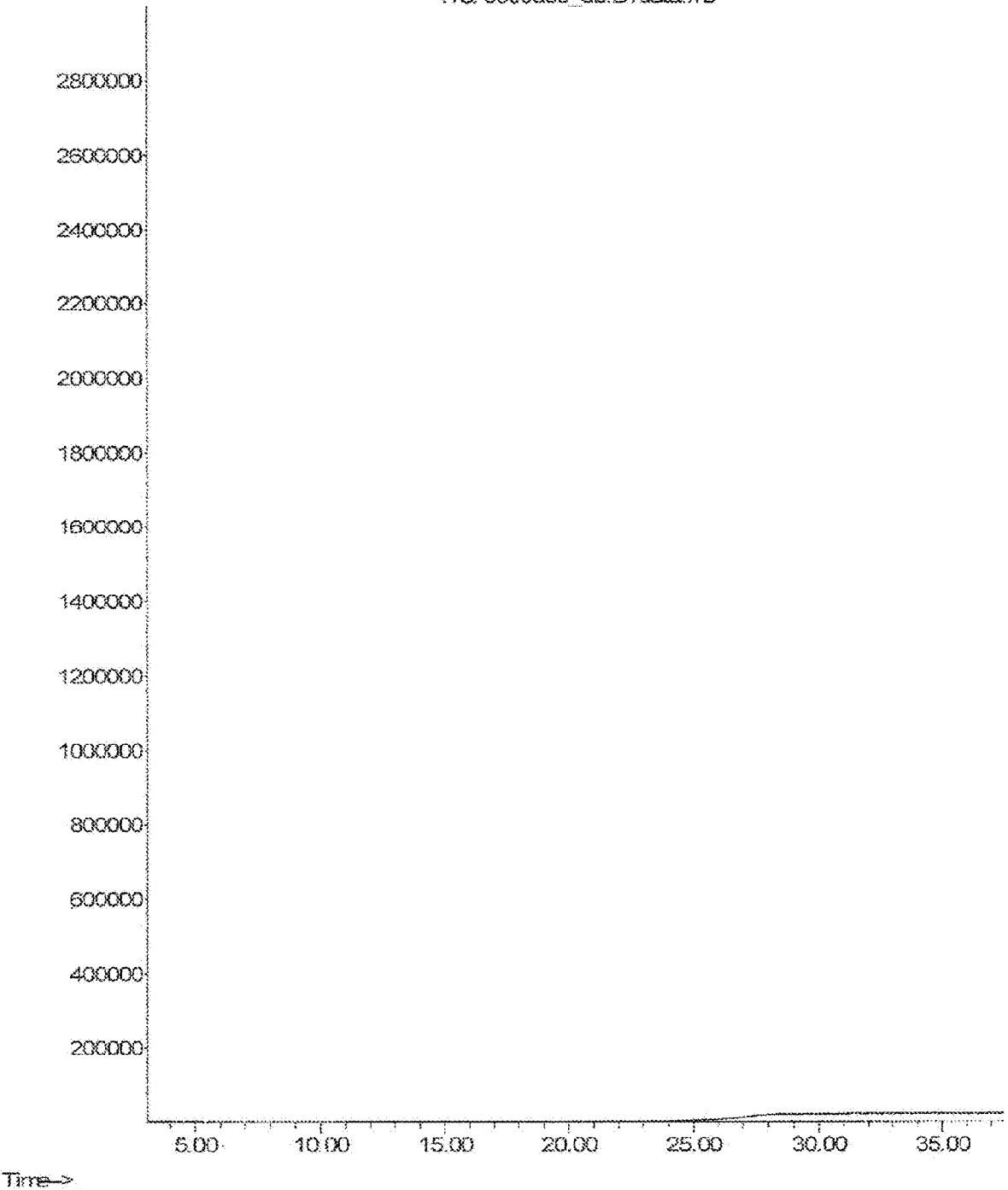
FIG. 6B is a chromatogram of a run on materials used in the practice of the present invention with modest off-gassing materials present, showing progressive emission results for 35 minutes.

FIG. 6B is a chromatogram of a run on materials used in the practice of the present invention with modest off-gassing materials present, showing progressive emission results for 35 minutes. As can be seen, there are three sharp (single compound) peaks with abundancies between 400,000 and 800,000 ppmw. There are three other sharp peaks at about 200,000. Peaks (single compounds off-gassed) at 200,000 and less are considered insignificant. The system meaningless display is still present at less than 200,000 ppmw at 26+ minutes.

Figure 6C:
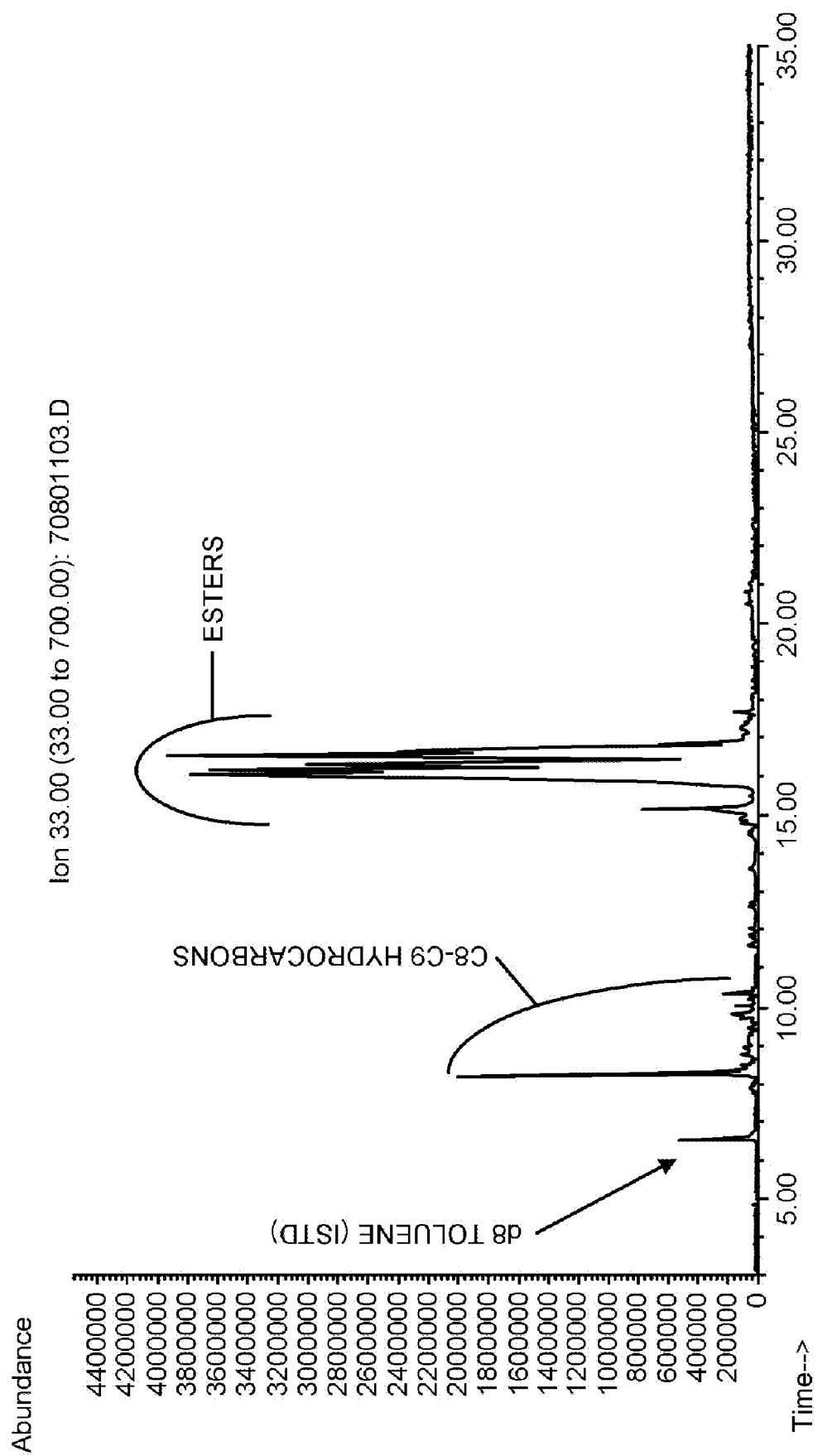
FIG. 6C is a chromatogram of a run on SoftSeal™ urethane gels materials used commercially in the field of practice of the present invention with extremely high off-gassing materials present, showing progressive emission results for 35 minutes.

FIG. 6C is a chromatogram of a run on SoftSeal™ urethane gels materials used commercially in the field of practice of the present invention with extremely high off-gassing materials present, showing progressive emission results for 35 minutes.

There are six broader peaks (extended released materials) with abundances over 2,000,000. Not only are there more peaks, but the amount of materials evidenced at each peak are multiples of those shown by low-density ePTFE materials shown in FIG. 6B. The system meaningless display is still present at less than 200,000 ppmw at 26+ minutes.

Figure 6D:
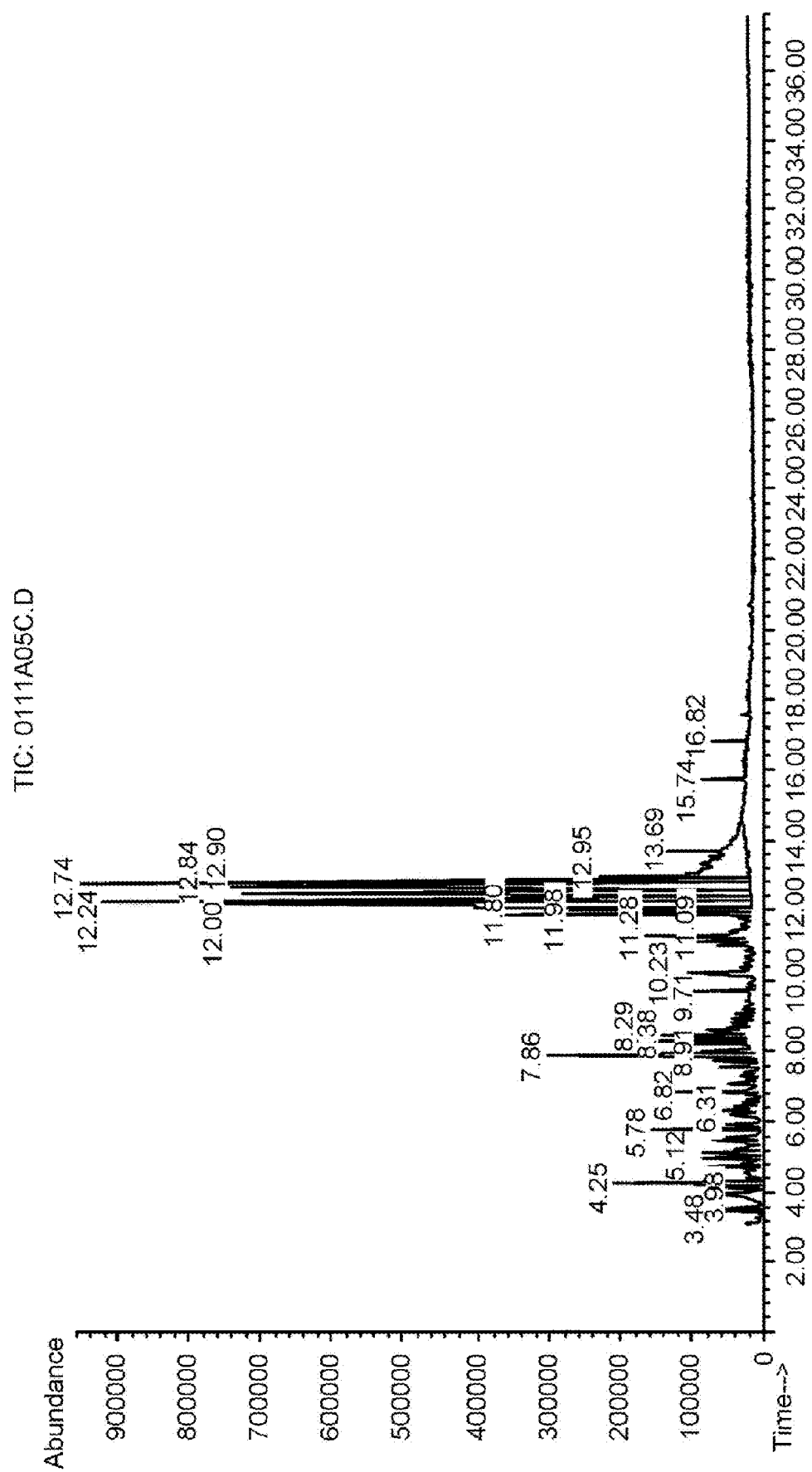
FIG. 6D is a chromatogram of a run on Easy Pour™ urethane gels materials used commercially in the field of practice of the present invention with both high off-gassing materials and large numbers of off-gassed materials present, showing progressive emission results for 35 minutes.

FIG. 6D is a chromatogram of a run on Easy Pour™ urethane gels materials used commercially in the field of practice of the present invention with both high off-gassing materials and large numbers of off-gassed materials present, showing progressive emission results for 35 minutes. This graph must be cautiously evaluated with respect to the information in FIG. 6B because of the different scales used for the abundances. Not only does the Easy Pour™ gel have two sharp peaks over 900,000 ppmw, but there are also about four additional peaks over 700,000 and at least three peaks over 300,000. The system meaningless display is still present at less than 200,000 ppmw at 26+ minutes.

The present invention therefore enables provision of a low off-gassing composition with five or fewer abundance peaks between 300,000 and 800,000, and even four or fewer (exactly three) abundance peaks between 300,000 and 800,000 within 20 minutes at 50° C. The system meaningless display is still present at less than 200,000 ppmw at 26+ minutes, and even exactly three abundance peaks between 300,000 and 800,000 within 20 minutes at 50° C.

Removable Inner Frame Assembly

In some situations, the filter elements 112, 202, 302, 402, 500 may need to be removed and replaced or reinstalled. As described above, the filter elements 112, 202, 302, 402, 500 may positioned within a frame 110, 324. A gel or tape within the frame 110, 324 may be configured to receive a linear edges extending downward from the outer edges of each filter element 112, 202, 302, 402, 500 and creating a seal therebetween. In some instances, over time, the gel and/or tape may deteriorate and need to be replaced. In other instances, the filter elements 112, 202, 302, 402, 500 may have to be replaced.

In prior art systems, if a filter element 112, 202, 302, 402, 500 is removed by simply lifting the filter element 112, 202, 302, 402, 500 from the frame 110, 324 the integrity of the gel or tape may be affected or degraded. If the filter element is then placed back in the frame, the seal between the filter element 112, 202, 302, 402, 500 and the gel or tape may not be effective or sufficient to reseal the filter.

With particular reference to FIGS. 7-11, 12A-12F, and 13A-13F in one aspect of the present invention, a frame assembly 700 with a removable inner frame assembly 701 and a main frame 702 is provided. In the illustrated embodiment, the removable inner frame assembly 701 includes an inner frame 704. The frame assembly 700 may replace the frame 110, 324 in the above-described embodiments. Alternatively, the removable inner frame 704 may be configured to work with the frame 110, 324 in the above embodiments. In specific applications, e.g., a clean room, the main frame 702 may be installed over all or substantially all of the room. Alternatively, a number of main frames 702 may be used to cover the room.

Figure 7:
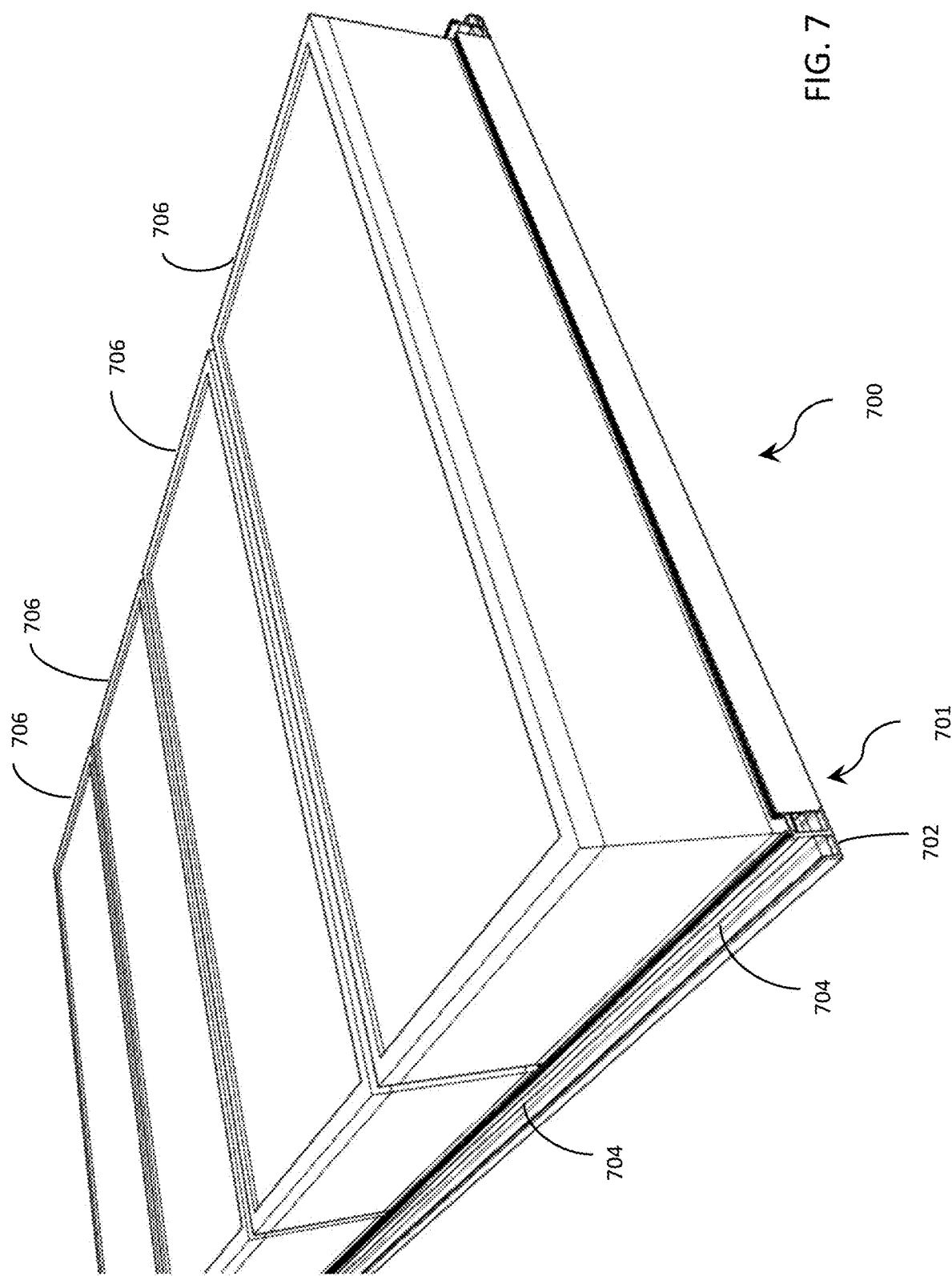
FIG. 7 is a perspective view of a frame assembly having a main frame and a removable inner frame assembly for use with a plurality of filter elements, according to an embodiment of the present invention.

With reference to FIG. 7, the main frame 702 may be configured to support a plurality or bank of filter elements 706. Each filter element 706 may have an associated inner frame 704. For example, in the illustrated embodiment, the main frame 702 may support up to 4 filter elements aligned linearly (FIG. 7). It should be noted that the main frame 702 may be provided in any configuration (e.g., in a 2 by 2 configuration) or configured to support a different number of filter elements 706.

The frame assembly 700 may include a main frame 702 within an opening 708 associated with each filter element 706. In the illustrated embodiment, the frame assembly 700 includes four removable inner frames 704. Each removable inner frame 704 is associated with one of the filter elements 706.

Figure 13A:
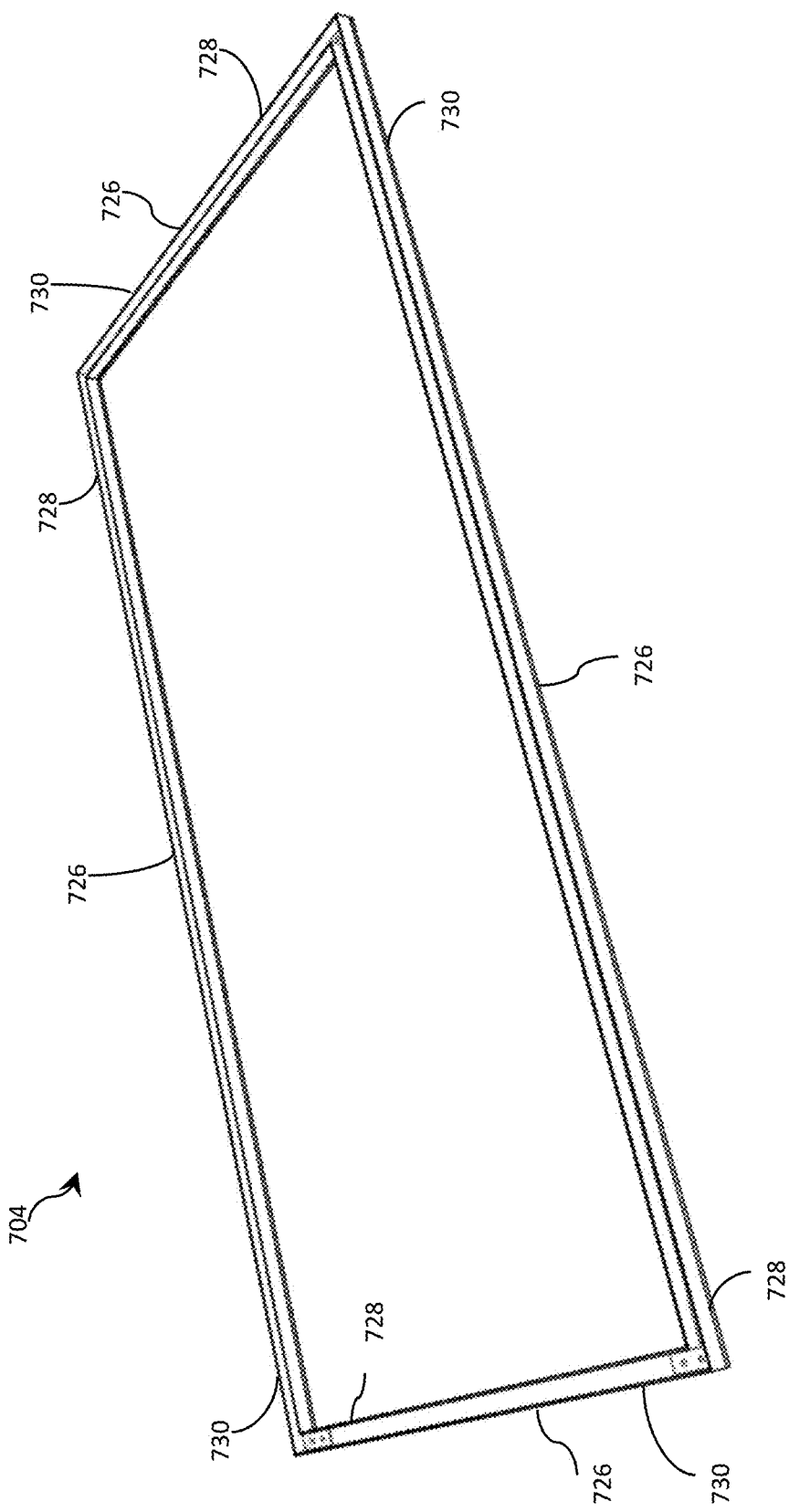
FIG. 13A is a perspective view of an inner frame with adjustable mechanisms, according to an embodiment of the present invention.

With specific reference to FIG. 13A, each inner frame 704 having a plurality of sides 726. Each side 726 have a first end 728 and a second end 730. As shown, the first end 728 of each side 726 is connected to a second end 730 of another (or adjacent) side 726. The length of the sides 726 is dependent upon the size of the associated filter elements 706.

Figure 8:
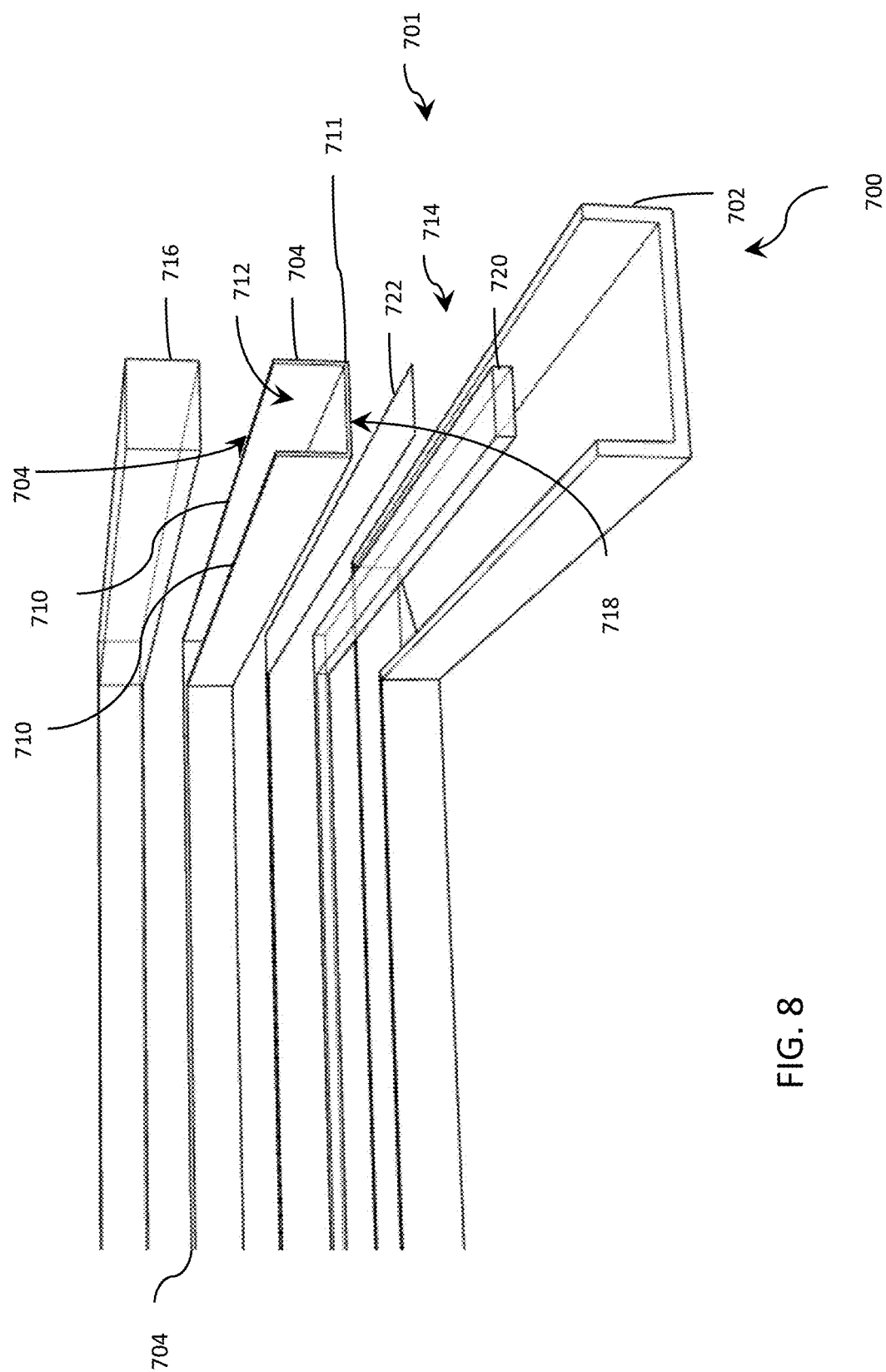
FIG. 8 is an exploded partial cross-sectional view of the main frame and the removable inner frame assembly of FIG. 7.
Figure 9:
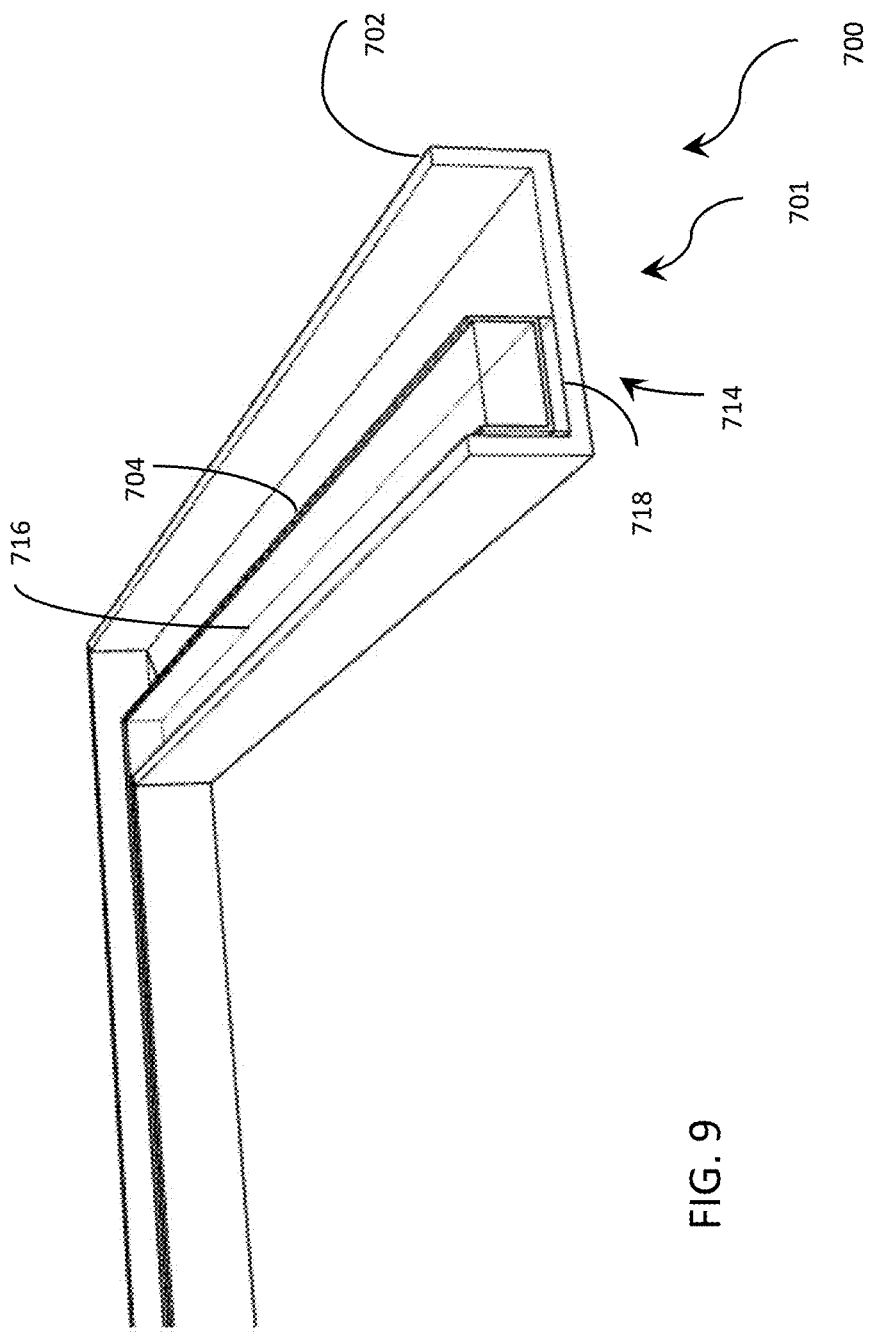
FIG. 9 is a partial cross-sectional view of the main frame and the removable inner frame assembly of FIG. 7.
Figure 10:
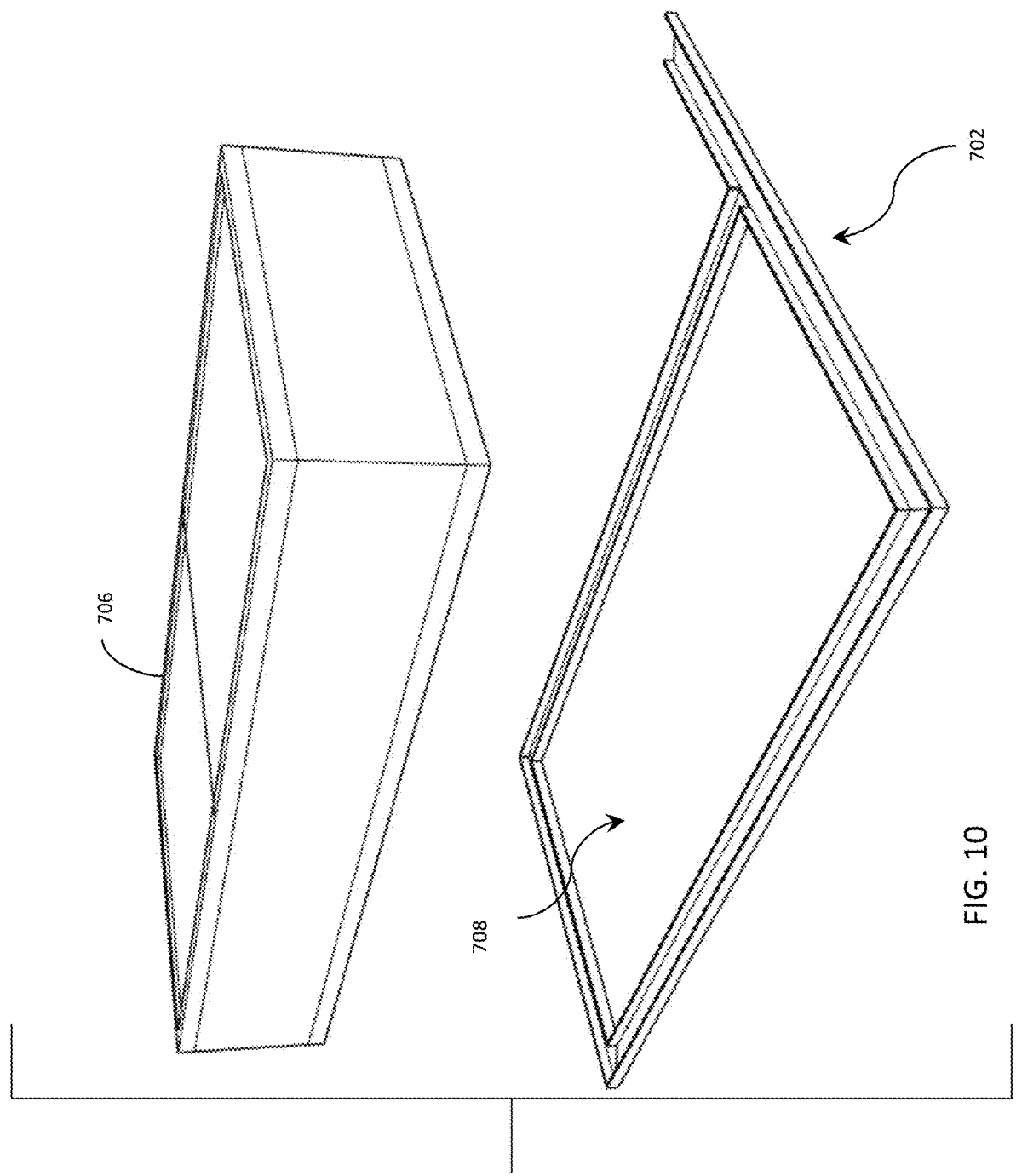
FIG. 10 a perspective view of a single filter element and the main frame of FIG. 7.
Figure 12A:
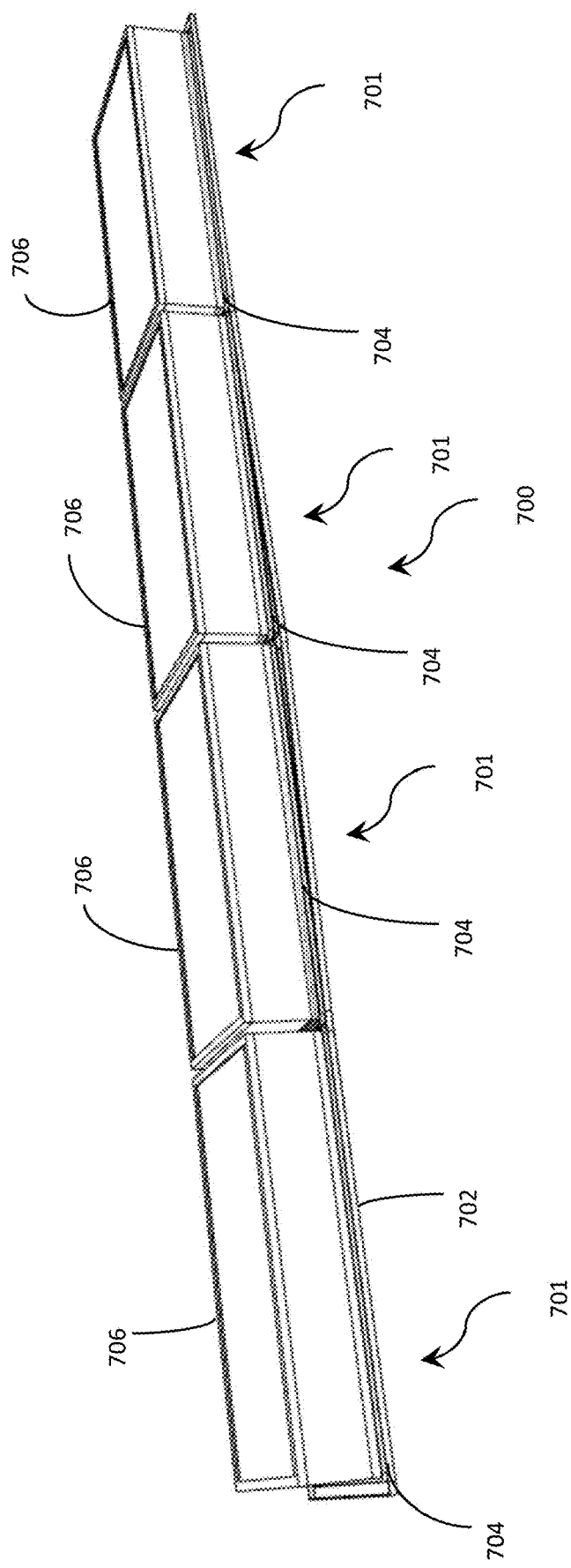
FIG. 12A is a perspective view of a frame assembly having a main frame and a removable inner frame assembly for use with a bank of four filter elements.
Figure 12B:
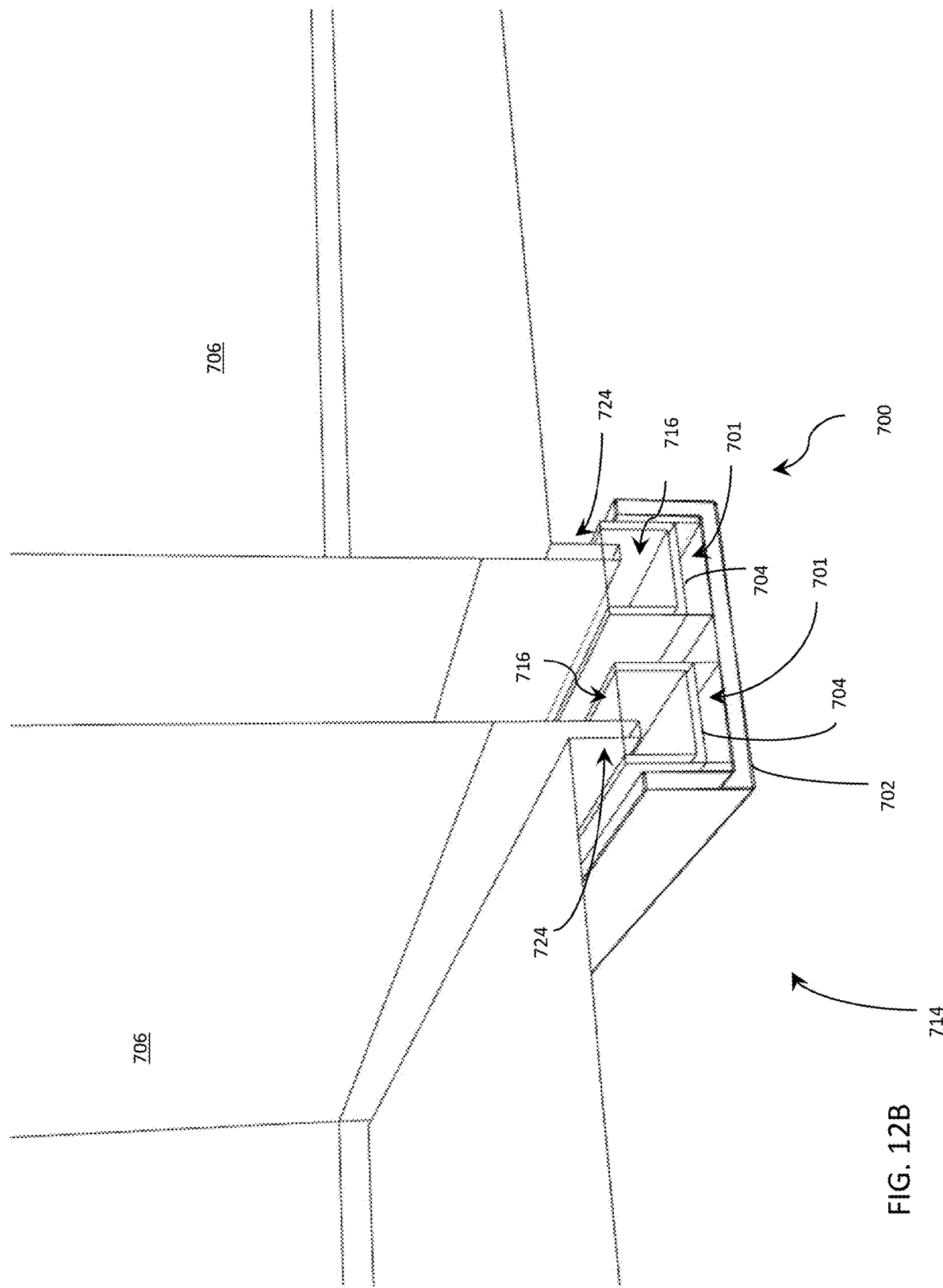
FIG. 12B is a partial perspective cross sectional view of a main frame and two removable inner frame assemblies.
Figure 12D:
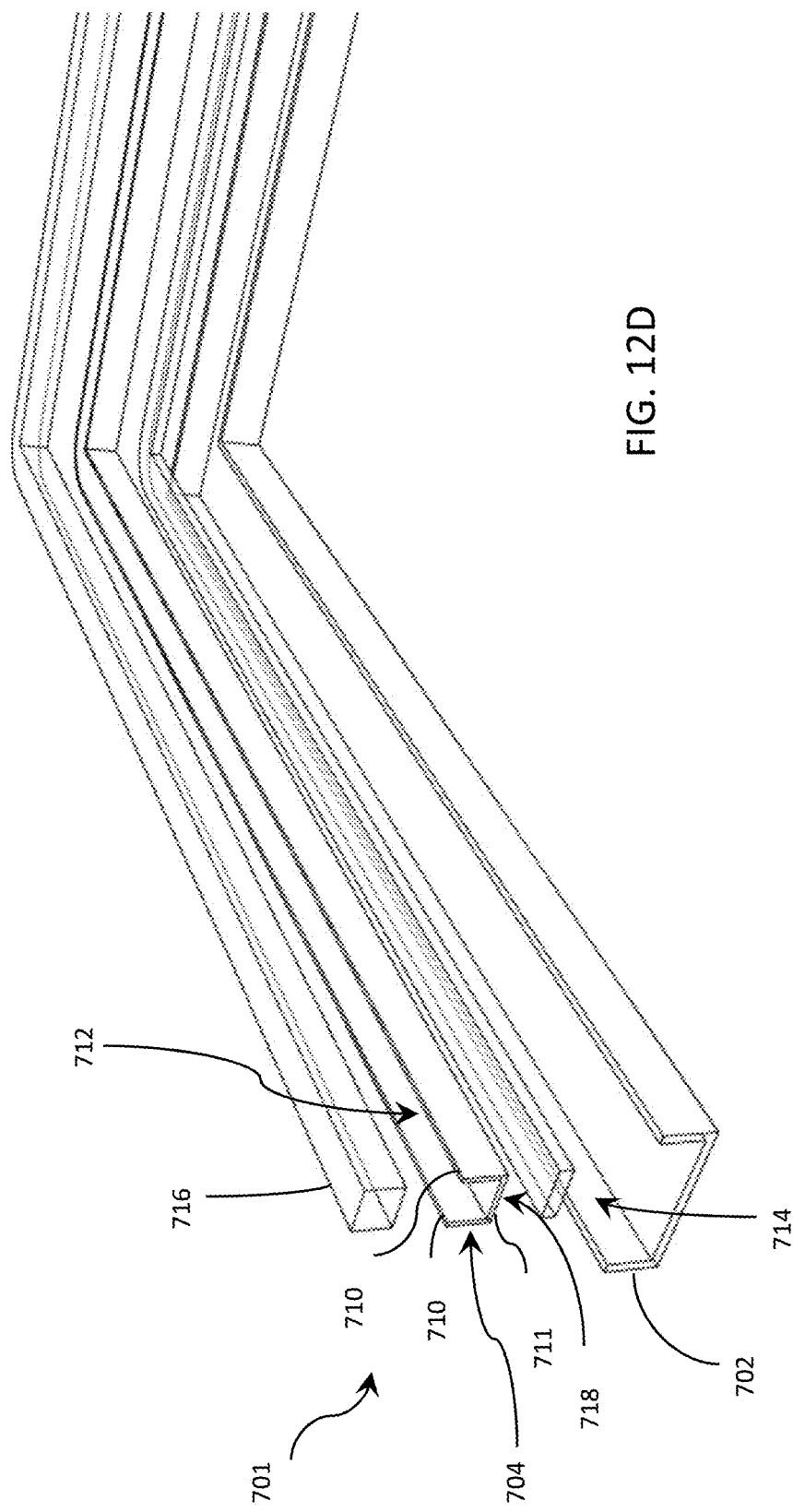
FIG. 12D is a partial exploded view of a removable inner frame assembly, according to another embodiment of the present invention.
Figure 12E:
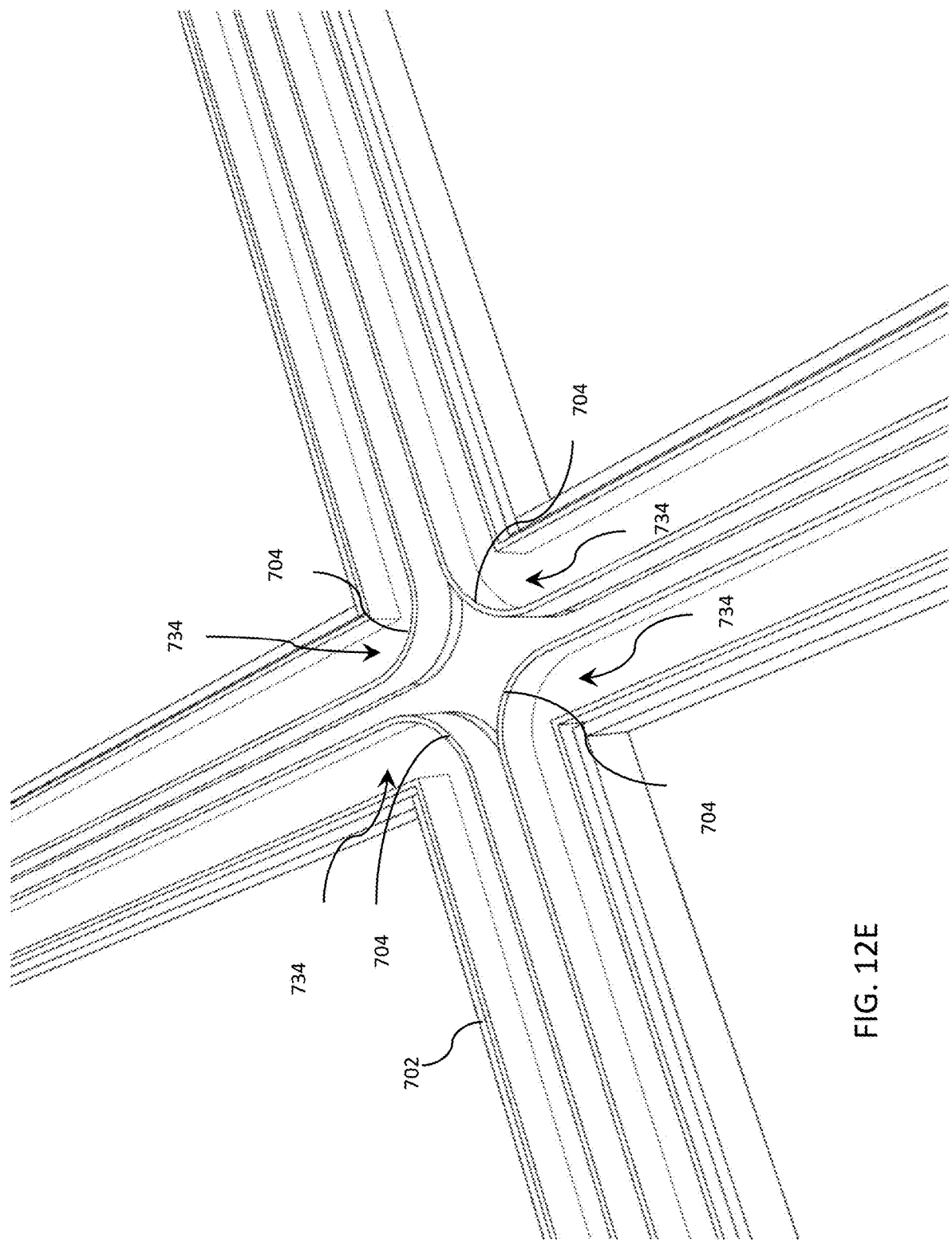
FIG. 12E is a partial perspective view of a main frame and four inner frames, according to an embodiment of the present invention.

As shown in FIGS. 8, and 12D, each side 726 has a pair of opposing legs 710 extending from a bottom 711 forming a u-shaped channel 712 extending around an outer perimeter of the inner frame 704.

The inner frame 704 may be formed from one or more pieces of extruded aluminum which may be fastened together by any appropriate means or fasteners, such as brackets, screws, rivets, nuts and bolts, clips, a combination thereof and the like (see below). The sides 728 of the inner frame 704 form the corners of the inner frame 704. In the illustrated embodiment of FIGS. 7-9, both the inner and outer edges are linear and meet at right angles.

Alternatively, the removable inner frame 704 may be formed as a unitary piece, such as by casting. In the illustrated embodiment shown in FIGS. 12C-12E, the outer edge of each corner may be rounded.

Figure 16A:
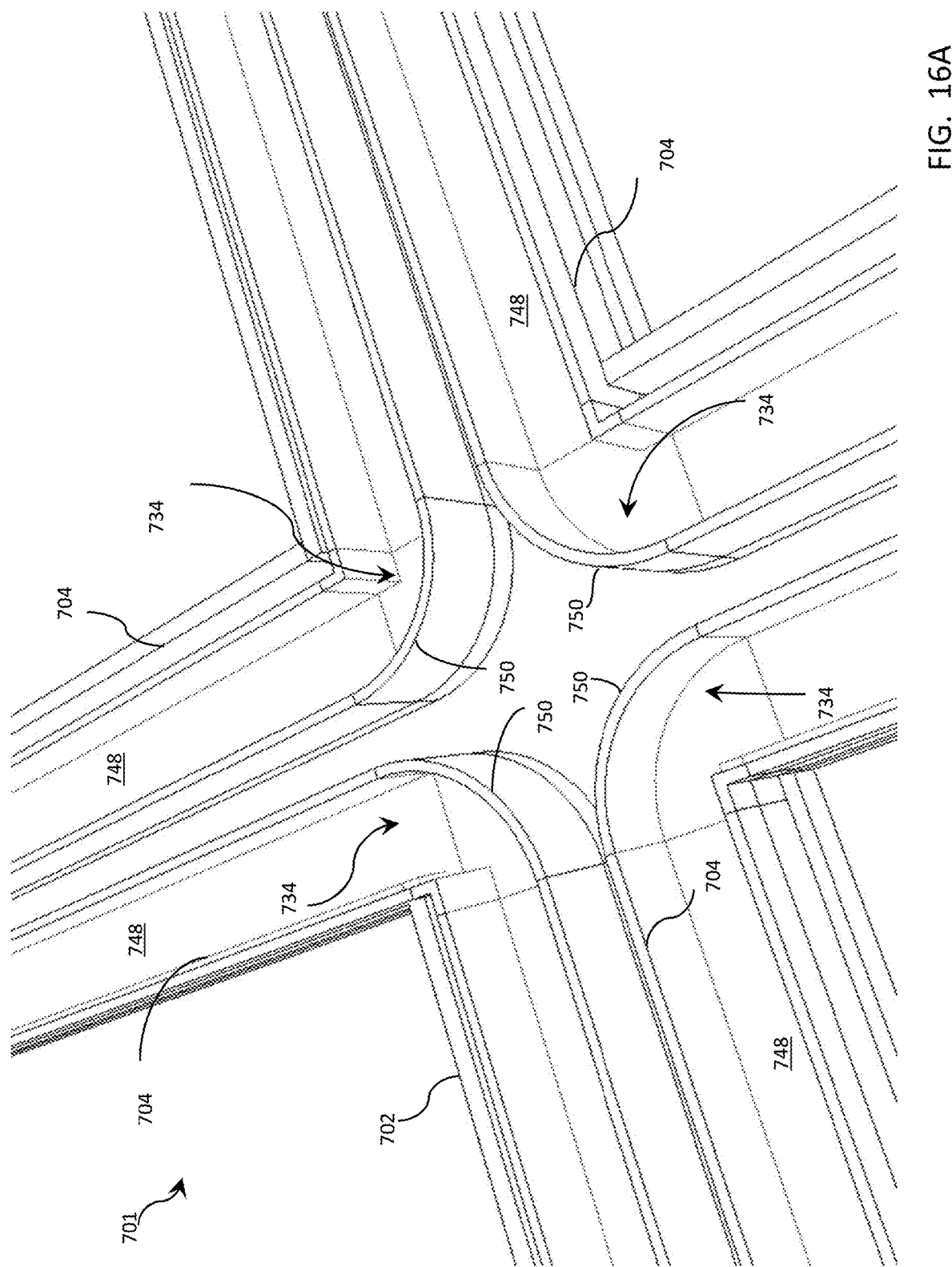
FIG. 16A is a perspective view of a removable inner module inner frame with a module inner frame, according to an embodiment of the present invention.
Figure 16B:
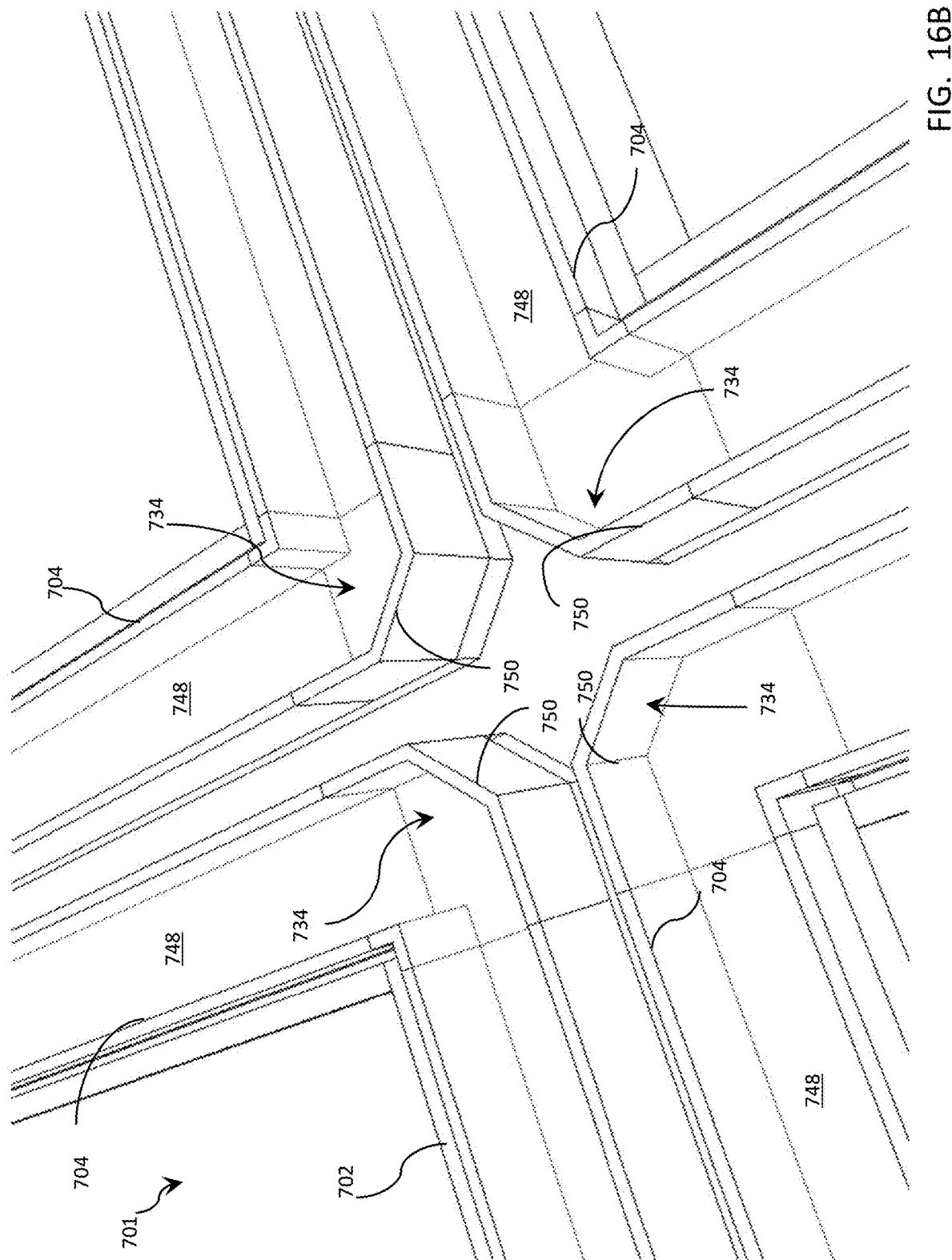
FIG. 16B is a perspective view of a removable inner module inner frame with a module inner frame, according to another embodiment of the present invention.
Figure 17A:
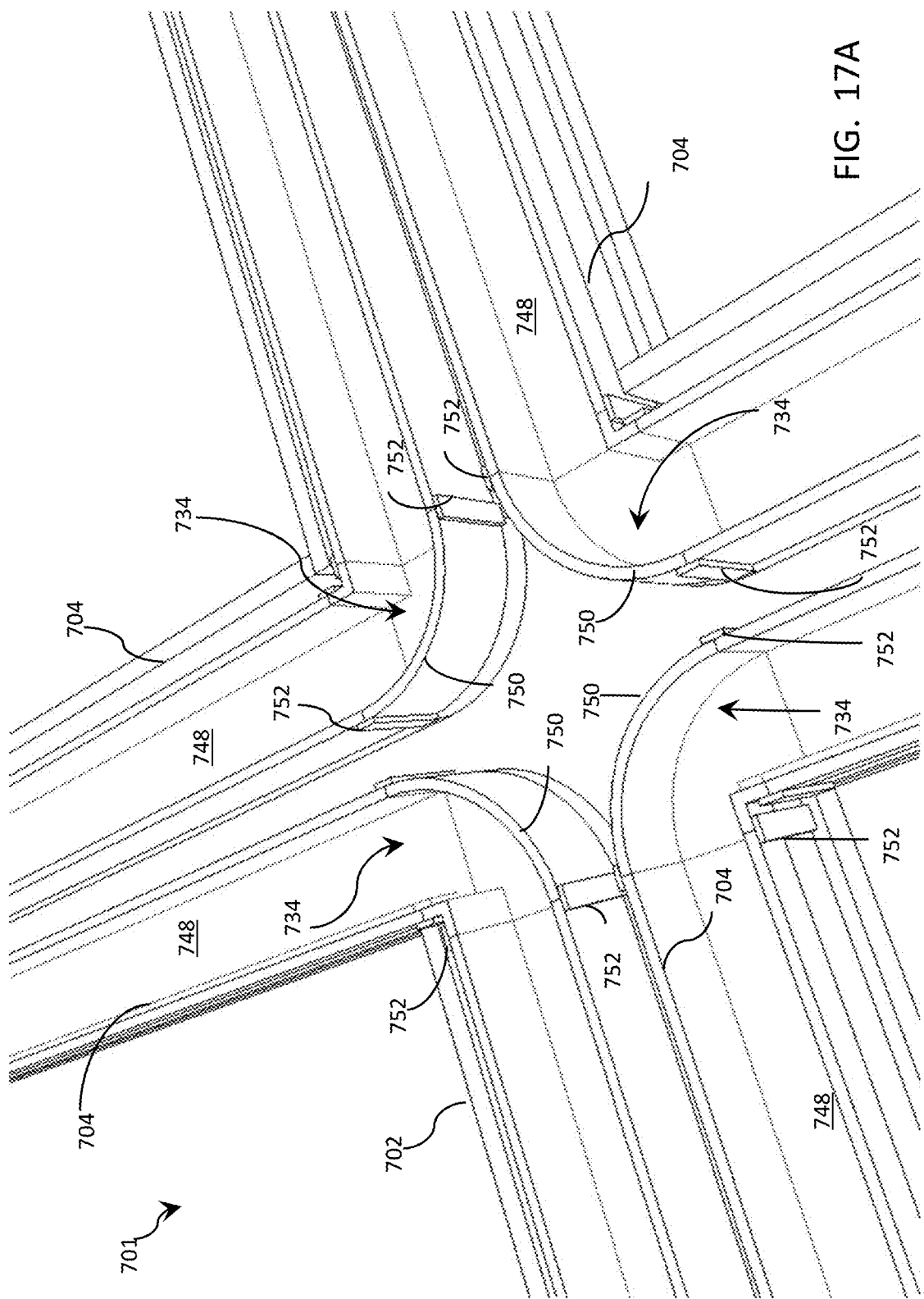
FIG. 17A is a perspective view of a removable inner module inner frame with a module inner frame, according to still another embodiment of the present invention.
Figure 17B:
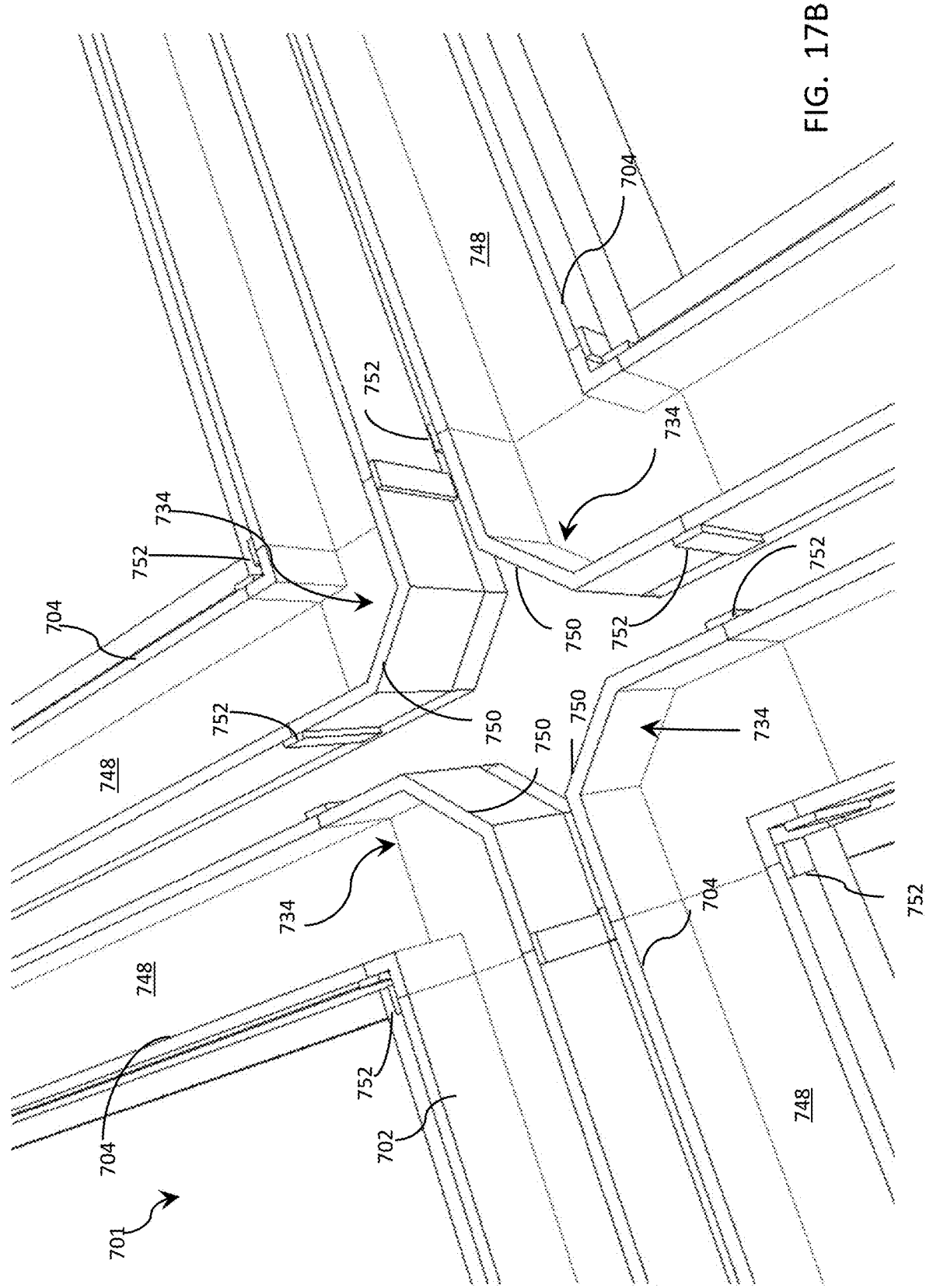
FIG. 17B is a perspective view of a removable inner module inner frame with a module inner frame, according to an additional embodiment of the present invention.

With particular reference to FIGS. 16A-16B and 17A-17B, in other embodiments of the present invention, the inner frame 704 may be modular. For example, in the illustrated embodiment, the inner frames 704 may be composed of u-shaped side members 748 and corner pieces 750. This modular arrangement allows the sides 726 of the inner frame 704 to be cut from standard lengths to fit particular filter elements. The inner frame 704 may then be assembled using the cut-to-length side members 748 and corner pieces 750. As shown, the corner pieces 750 may have different shapes, for example, rounded corners (FIGS. 16A and 17A) or 45 degree corners (FIGS. 16B and 17B). In some embodiments, the corner pieces 750 may include integral clips, located, for example, along the bottom surface (not shown) to connect the corner pieces 750 at each end to one of the side members 748 (FIGS. 16A and 16B). In other embodiments, a separate splicer or clip 752 may be used to connect the side members 748 to the corner pieces 750.

With specific reference to FIG. 8, the removable inner frame assembly 701 includes a bottom sealant layer 712 attached to a bottom surface 718 of the bottom 711 inner frame 704 and a top sealant layer 716 located within the u-shaped channel 712.

In one embodiment, the bottom sealant layer 712 includes a sealant 720 embedded in a substrate 722. Generally, the cross-section of the sealant 720 may be larger than the substrate 722. In other words, the substrate 722 may be enclosed entirely within the sealant 720. Alternatively, the substrate 722 may be located at or near the top of bottom of the sealant 720. The sealant 720 may be a two-part urethane or silicon gel. Such sealants are design specifically to act as a sealant in clean room environments. However, as a gel these sealants are not effective when filter elements need to be repeatedly removed and replaced. The gel breaks apart and loses integrity affecting the effectiveness of the seal.

One such gel is available from Dow under the name DOWSIL™ 3-4207 Dielectric Tough Gel Clear-Green. The bottom sealant layer 712 may be affixed to the bottom surface 718 of the removable inner frame 704 via a series of fasteners 732. The substrate 722 may be made for an absorbent material such as a twill material. In one embodiment, the twill material may be composed from, at least partly, cotton. The sealant 720 may have a cross-sectional area that is larger than the substrate 722. The substrate 722 assists in maintaining the integrity of the bottom sealant layer 712 and may assist in maintaining the bottom sealant layer 712 attached to the inner frame 704.

The top sealant layer 716 may be composed of a urethane or silicon base gel or tape, a Teflon based sealant, ultralow density polytetrafluoroethylene tape (see above), or other appropriate sealant material. The top sealant layer 716 is configured to accept or receive the lower or knife edge 724 extending from the bottom surface of each filter element 706. This arrangement allows the filter elements 706 to be repeatedly installed and uninstalled without catastrophic failure.

The inner frame 704 along with the bottom sealant layer 714 and the top sealant layer 716 may be preassembled and stored until needed. A bottom cover (not shown) and a top cover (not shown) may be utilized to protect the bottom sealant layer 714 and the top sealant layer 716, respectively prior to usage. The removable inner frame assembly 701 may be used in new installations or used to replace the sealant gel in old installation.

To install a filter element 706 using the removable inner frame assembly 704, the bottom cap is first removed. The removable inner frame assembly 704 may then be positioned within the main frame 702. The top cover may then be removed and the filter element 706 installed.

Although not shown in FIGS. 7-11, 12A-12F, and 13A-14F, a spring-based cable system may be utilized (see above) to cinch down each filter element 706. The spring-based cable system may be coupled to the main frame 702 or the removable inner frame assembly 701.

The removable inner frame assembly 701 may also be used in old installations in which the gel within the frame has failed and needs to be replaced and/or the filter elements must be removed and reinstalled or replaced.

To replace an existing filter in an older installation, the older gel needs to be removed. This may be a difficult and time-consuming process. For example, some gel must be removed or dissolved using 91-99% isopropyl alcohol. After the gel is removed, the surface of the frame must be cleaned before new gel is poured into the frame. Prior art gels must be activated with a catalyst or mixed in a 1:1 ration then poured within the frame. This process is prone to errors and accidents and some gels have a 16-36 hour curing time before the filter element can be installed.

The preassembled removable inner frame assembly 704 of the present invention may be installed very quickly. The bottom sealant layer 714 does not require any preparation at the installation site and may have a shelf life of up to 2-3 years based on storage conditions.

Further, once installed, the combined filter element 706 and removable inner frame 704 may be lifted out of the main frame 702. The bottom sealant layer 714 formed by the substrate 722 and the sealant 720 may lifted along with the filter element 706. The combination of the sealant 720 and the substrate 722 helps ensure that the entire bottom sealant layer 714 is removed from the main frame 702. The removable inner frame assembly 701 may be reused or a new preassembled removable inner frame 704 may used without it being necessary to clean the upper surface of the main frame 702.

In another aspect of the present invention, the removable inner frame assembly 701 may include an adjusting means 734 for allowing the connected first and second ends 728, 730 of adjacent sides 726 of the inner frame 704 to be adjusted. In some instances, a filter element 706 may not fit easily within the u-shaped channel 712 of the inner frame 704. This may be due to warping or misalignment of the filter element 706 or other reasons. The adjusting means 734 allows the sides 726 of the inner frame 704 be adjusted, for example, the position of one of the legs 710 of one of the sides 726 may be adjusted to accommodate the filter element 706. Or the positioned of one of the sides 726 may be adjusted related to the connected or adjacent side 726. In one embodiment, the adjusting means 736 is provided by an aspect of the inner frame 704. For example, the inner frame 704 may be configured or designed to allow the inner frame 704 to be physically adjusted or stretched to accommodate the filter element 706.

Figure 14:
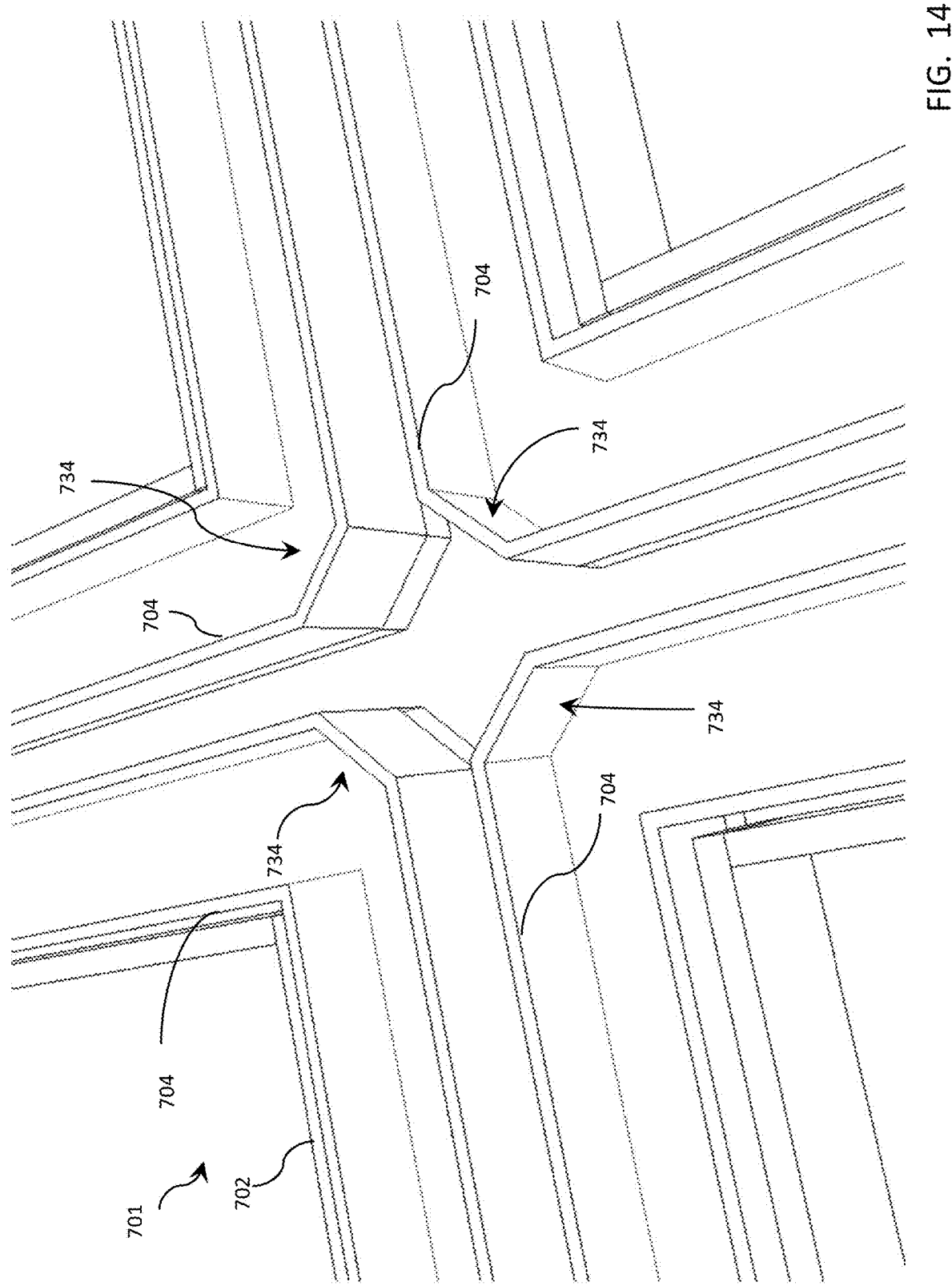
FIG. 14 is a perspective view of a removable inner frame assembly with an inner frame, according to another embodiment of the present invention.
Figure 15:
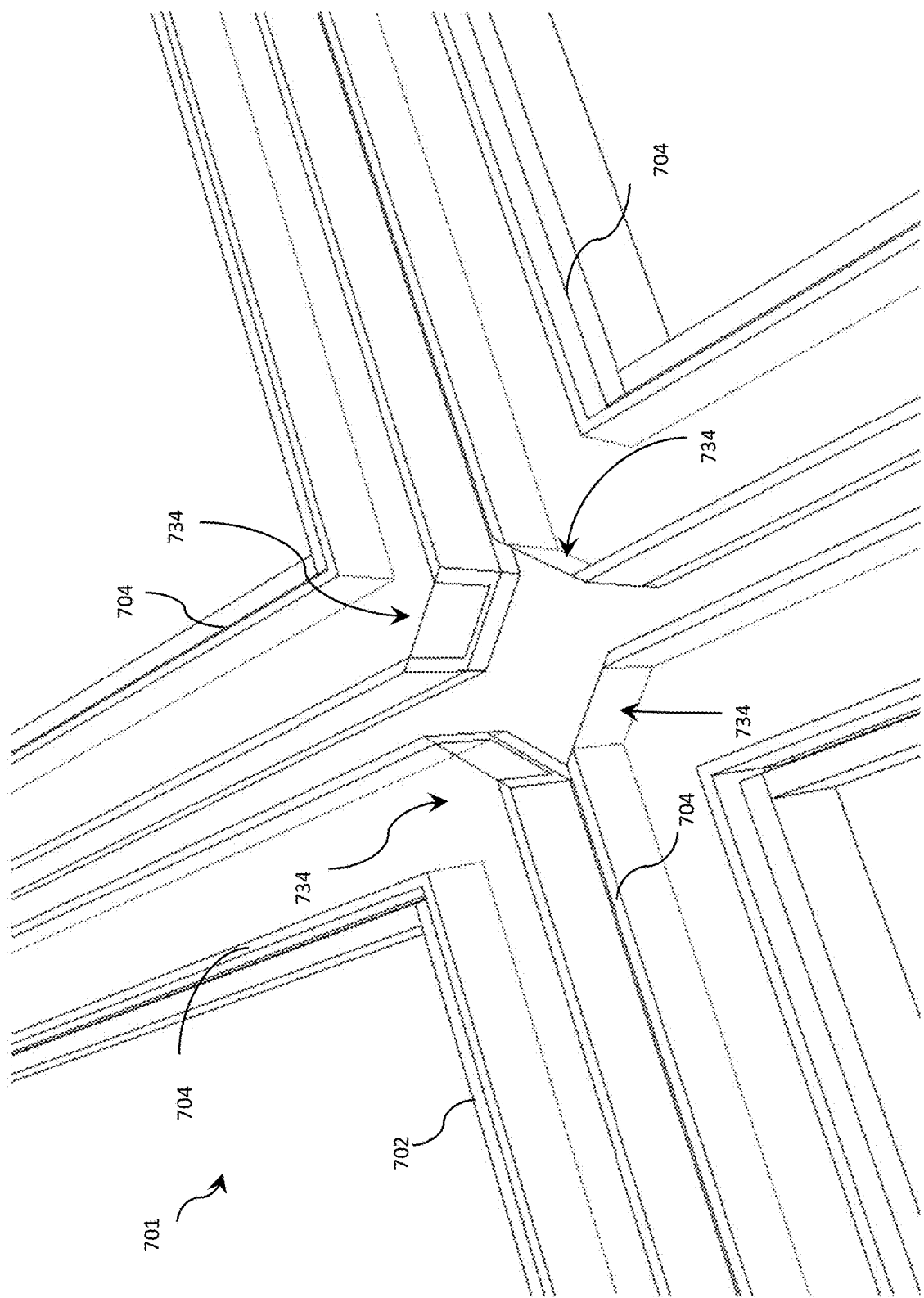
FIG. 15 is a perspective view of a removable inner frame assembly with an inner frame, according to another embodiment of the present invention.

In another embodiment, the sides 726 of the inner frame 704 may form rounded corners (see FIGS. 12E-12F), or may include a 45 degree corners (see FIG. 14). Alternatively, the legs 710 of the sides 726 may end prior to the corner(s) leaving the corners open (see FIG. 15). These modifications to the corner may form at least part of the adjusting means and allow for the inner frame 704 to be adjusted or otherwise accommodate the filter element(s) 706.

In other embodiments, the adjusting means 734 may be formed by the modular side members 748 and corner pieces 750 (and splicers/clips 752 if used).

In another embodiment, the adjusting means 734 includes an adjusting mechanism 736 as shown in FIGS. 13A-13F. In the illustrated embodiment, the sides 726 of the inner frame 704 are not directly connected or fastened to one another but may be slidably connected to one another by the adjusting mechanism 736. As shown, the removable inner frame assembly 701 may include an adjusting mechanism 736 located at each corner or junction between two adjacent sides 726 of the inner frame 704.

Figure 13B:
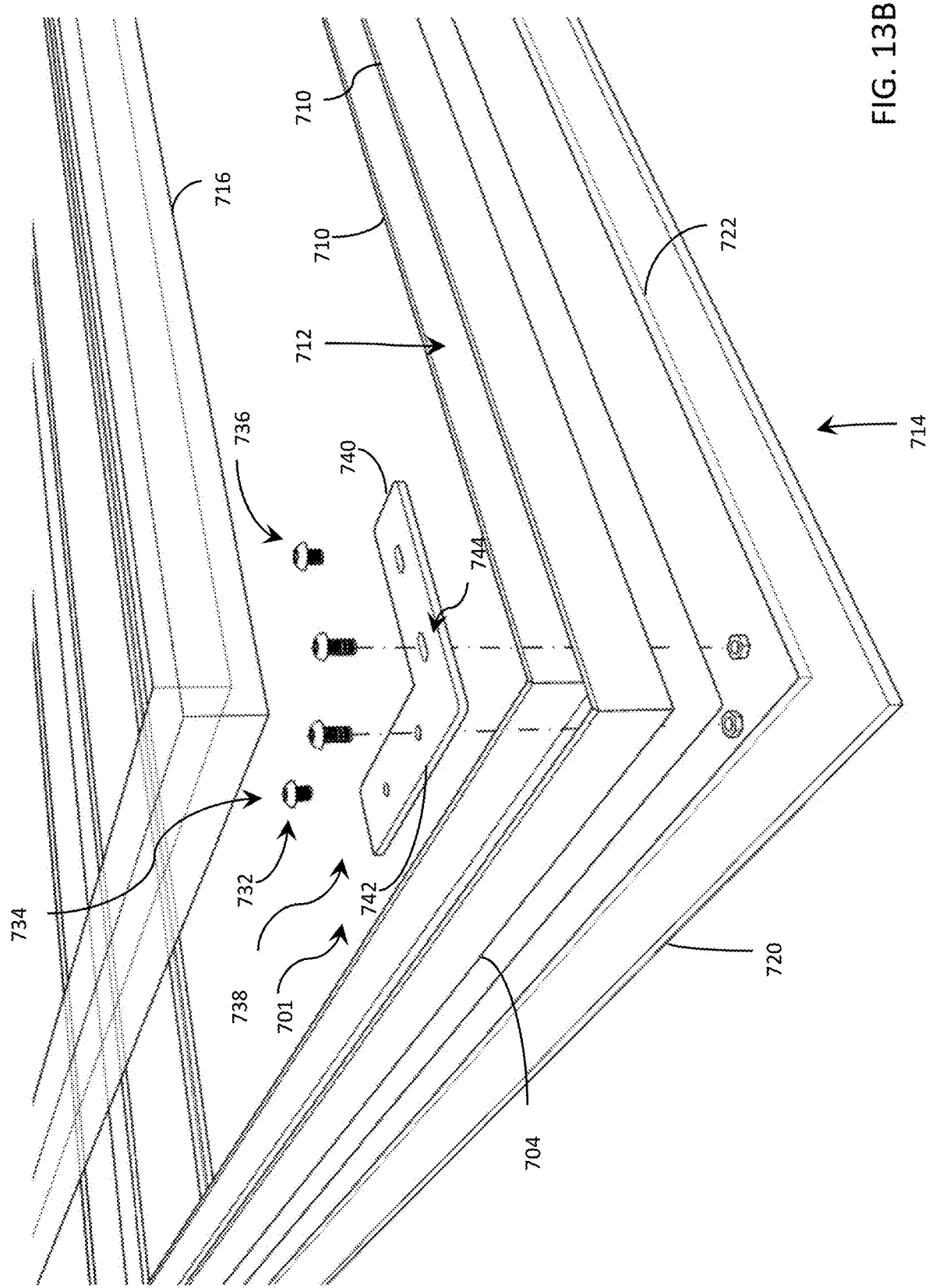
FIG. 13B is an exploded view of a removable inner frame assembly and an adjustable mechanism, according to an embodiment of the present invention.
Figure 13C:
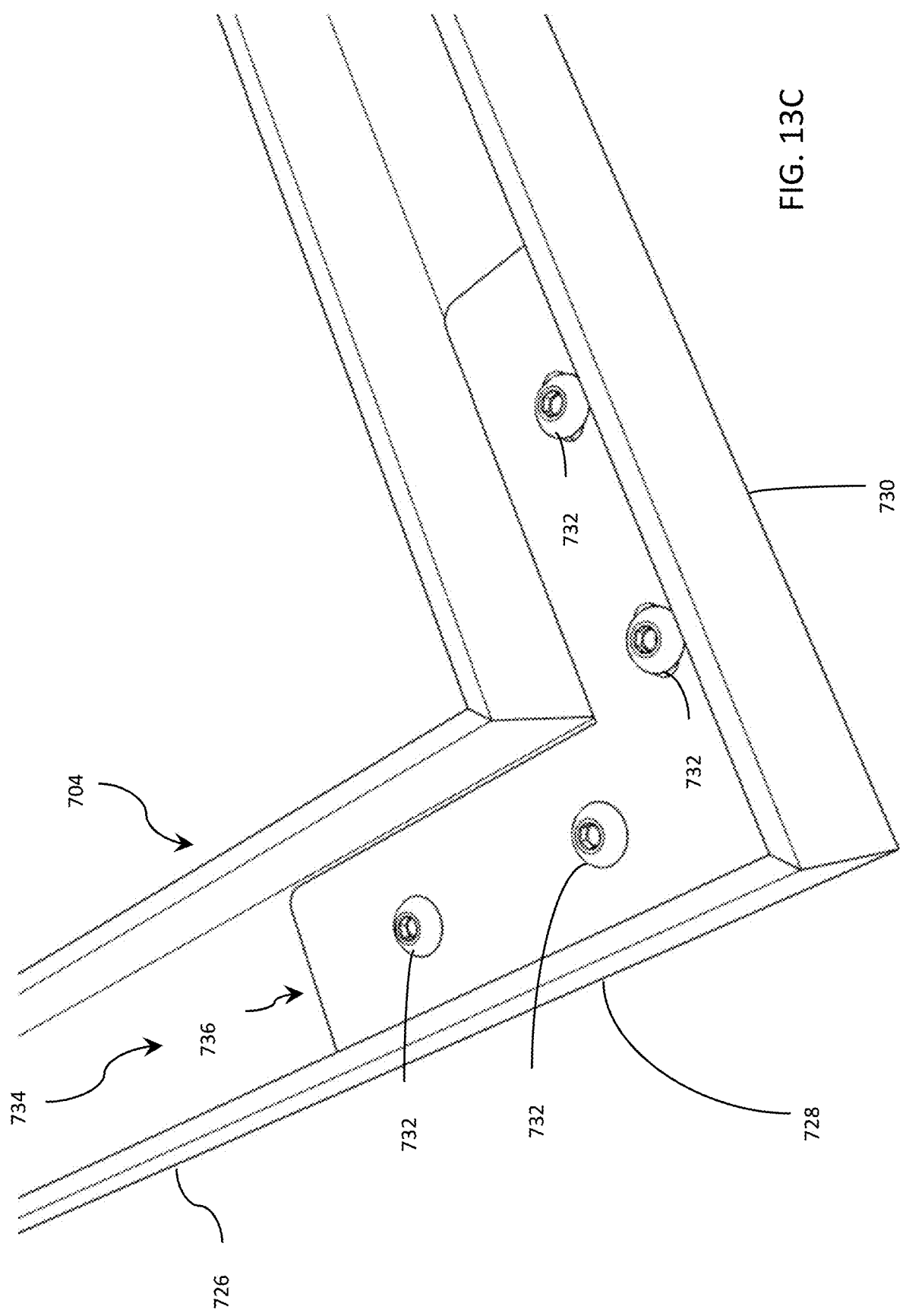
FIG. 13C is a partial view of the removable inner frame assembly and the adjustable mechanism of FIG. 13B.
Figure 13D:
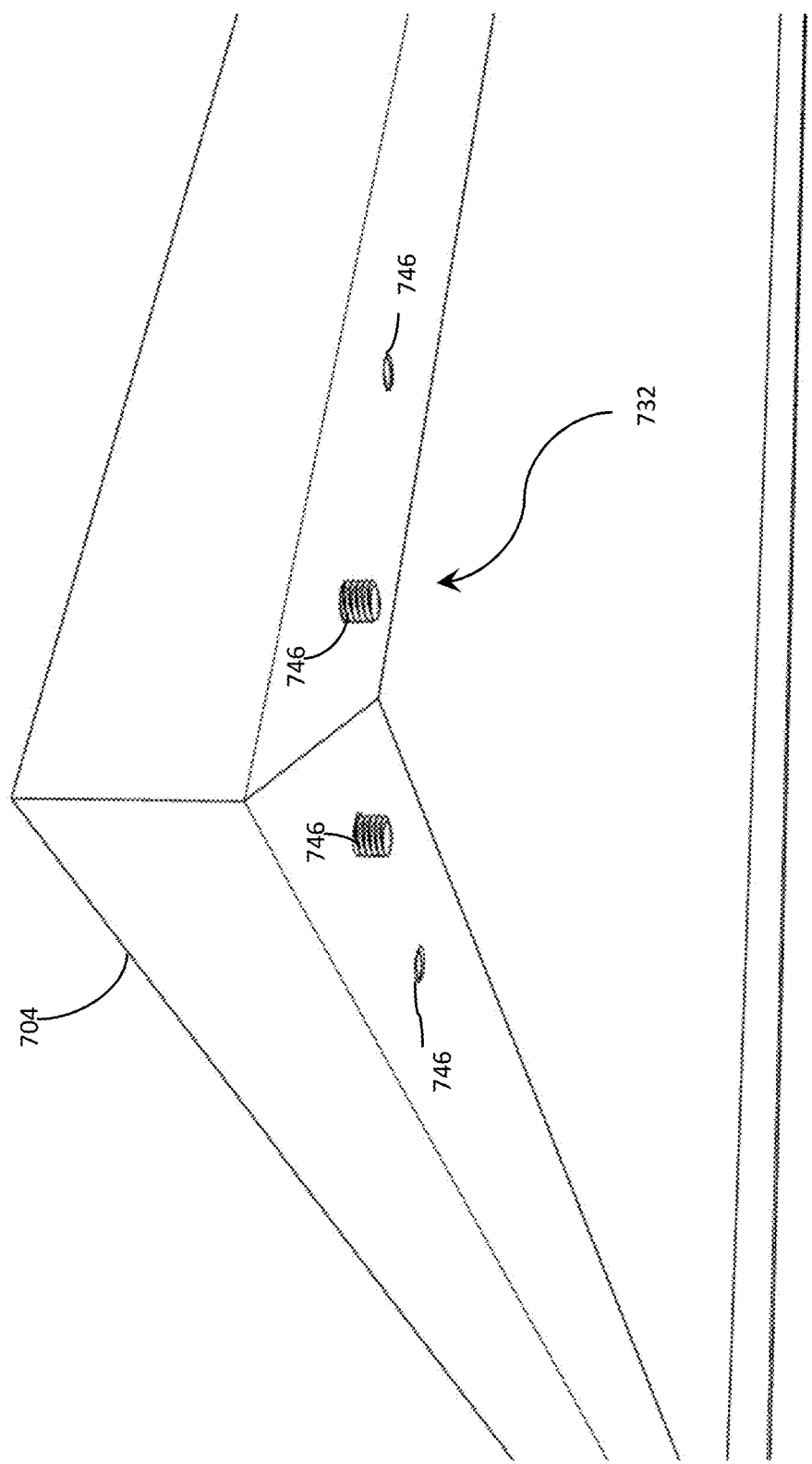
FIG. 13D is a partial view of a portion of the removable inner frame assembly and adjustable mechanism of FIG. 13B.
Figure 13E:
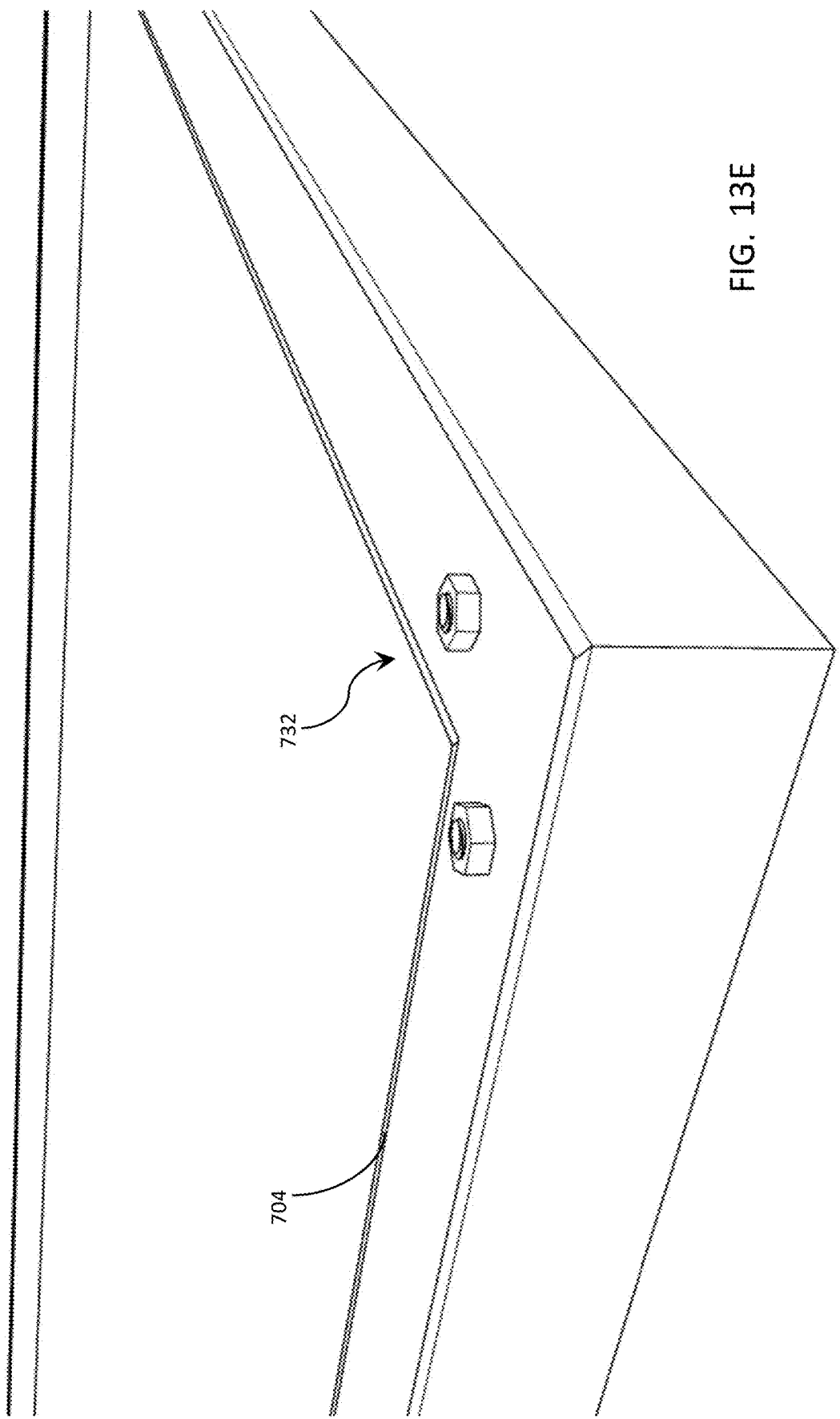
FIG. 13E is a second partial view of a portion of the removable inner frame assembly and adjustable mechanism of FIG. 13B.

With specific reference to FIGS. 13B-13C, each adjusting mechanism 736 may include a bracket 738 with a first end 740 and a second end 742. The first end 740 of the bracket 738 may be coupled to the first end 728 of one of the side 726 of the inner frame 704 and the second end 742 of the bracket 738 may be coupled to the second end 730 of an adjacent side 726 of the inner frame 704.

Each of the first and second ends 740, 742 includes at least one aperture 744. The at least one aperture 744 on at least one of the first and second ends 740, 742 is slotted or elongated. Respective fasteners 732, for example, a bolt or screw and nut, may be used to fasten the bracket(s) 736 to the inner frame 704 through apertures 746. The elongated or slotted apertures 744 allow one of the sides 726 to be moved or adjusted relative to the adjacent side 726.

Figure 13F:
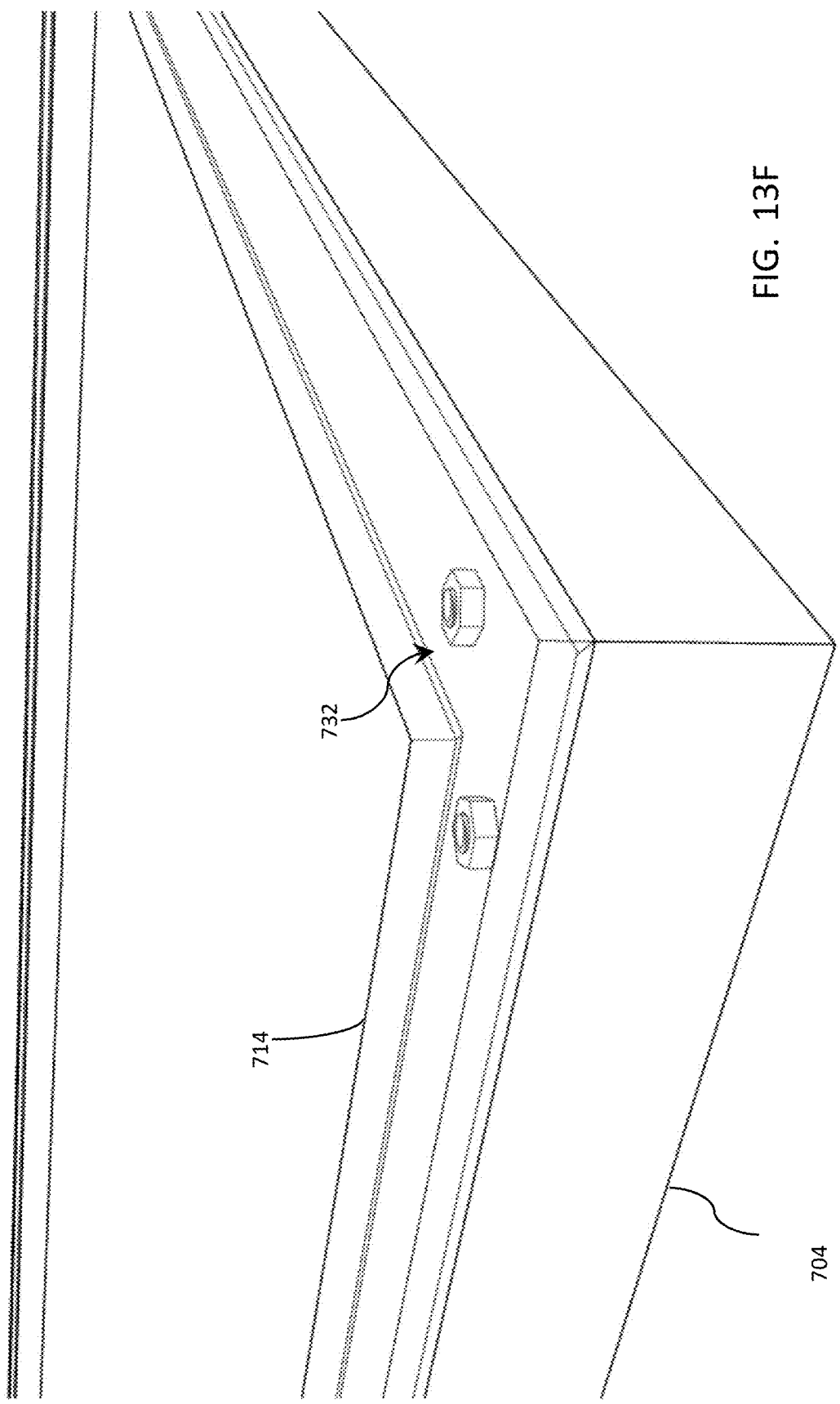
FIG. 13F is a third partial view of a portion of the removable inner frame assembly and adjustable mechanism of FIG. 13B.

It should be noted that the fasteners 732 used to connect the bracket ends 740, 742 to the sides 726 of the inner frame 704 may be the same fasteners 732 used to fasten the bottom sealant layer 714 to the inner frame 704 (see FIG. 13F). Alternatively, a different set of fasteners may be used.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A sealant layer configured to be applied to an inner frame associated with a filter element and a main frame, the inner frame having a plurality of sides and a bottom forming a u-shaped channel extending around a perimeter of the inner frame, the sealant layer comprising:
   a substrate; and,
   sealant embedded within the substrate, the bottom sealant layer configured to be affixed to a bottom surface of the bottom of the inner frame, the bottom sealant layer being configured to allow the inner frame to be releasably coupled to the main frame.

2. A removable inner frame assembly for use with a filter element and a main frame, the filter element having a lower edge extending from a perimeter of the filter element, the removable inner frame assembly comprising:
   an inner frame having a plurality of sides, each side have a first end and a second end, wherein the first end of each side is connected to a second end of another side, each side having a pair of opposing legs extending from a bottom forming a u-shaped channel extending around a perimeter of the removable inner frame assembly;
   a bottom sealant layer affixed to a bottom surface of the bottom of each side of the inner frame, the bottom sealant layer being configured to allow the removable inner frame assembly to be releasably coupled to the main frame; and
   a top sealant layer within the u-shaped channel formed by each side of the inner frame, the top sealant layer being configured to receive the lower edge of the filter element.

3. The removable inner frame assembly, as set forth in claim 2, wherein the bottom sealant layer includes a sealant embedded within a substrate.

4. The removable inner frame assembly, as set forth in claim 3, where the bottom sealant layer is affixed to the inner frame by a plurality of fasteners.

5. The removable inner frame assembly, as set forth in claim 2, wherein the inner frame is composed from aluminum.

6. The removable inner frame assembly, as set forth in claim 2, further comprising adjusting means for allowing the connected first and second ends of adjacent sides to be adjusted.

7. The removable inner frame assembly, as set forth in claim 2, further comprising a plurality of adjusting mechanisms associated with each pair of connected first and second ends and being configured to allow the connected first and second ends of adjacent sides of the inner frame to be adjusted.

8. The removable inner frame assembly, as set forth in claim 7, wherein each of the adjusting mechanisms includes a bracket having a first bracket end a second bracket end, the first bracket end being coupled to the first end of one of the sides of the inner frame, the second bracket end being coupled to the second end of another one of the sides of the inner frame.

9. The removable inner frame assembly, as set forth in claim 8, wherein the first and second bracket ends of each bracket have at least one aperture, the bracket configured to be coupled to the sides of the inner frame by fasteners.

10. The removable inner frame, as set forth in claim 9, wherein the apertures on at least one of the first and second bracket ends are slot-shaped to allow the connected side of the inner frame to be adjusted relative to the adjacent side.

11. A removable inner frame assembly for use with a filter element and a main frame, the filter element having a lower edge extending from a perimeter of the filter element, the removable inner frame assembly comprising:
    an inner frame having a plurality of sides, each side have a first end and a second end, wherein the first end of each side is connected to a second end of another end, each side having a pair of opposing legs extending from a bottom forming a u-shaped channel extending around a perimeter of the removable inner frame assembly;
    a bottom sealant layer affixed to a bottom surface of the bottom of each side of the inner frame, the bottom sealant layer being configured to allow the removable inner frame assembly to be releasably coupled to the main frame, the bottom sealant layer including a sealant and a substrate, the sealant being embedded within the substrate;
    a top sealant layer within the u-shaped channel formed by each side of the inner frame, the top sealant layer being configured to receive the lower edge of the filter element; and,
    a plurality of adjusting mechanisms associated with each pair of connected first and second ends and being configured to allow the connected first and second ends of adjacent sides of the inner frame to be adjusted, wherein each of the adjusting mechanisms includes a bracket having a first bracket end a second bracket end, the first bracket end being coupled to the first end of one of the sides of the inner frame, the second bracket end being coupled to the second end of another one of the sides of the inner frame, wherein the first and second bracket ends of each bracket have at least one aperture, the bracket configured to be coupled to the sides of the inner frame by fasteners, wherein the apertures on at least one of the first and second bracket ends are slot-shaped to allow the connected side of the inner frame to be adjusted relative to the adjacent side.

12. A frame assembly for use with a filter element, the filter element having a lower edge extending from a perimeter of the filter element, the frame assembly comprising:
    an inner frame having a plurality of sides, each side have a first end and a second end, wherein the first end of each side is connected to a second end of another side, each side having a pair of opposing legs extending from a bottom forming a u-shaped channel extending around a perimeter of the removable inner frame assembly;
    a main frame configured to receive the inner frame;

a bottom sealant layer affixed to a bottom surface of the bottom of each side of the inner frame, the bottom sealant layer being configured to allow the inner frame to be releasably coupled to the main frame; and, a top sealant layer within the u-shaped channel formed by each side of the inner frame, the top sealant layer being configured to receive the lower edge of the filter element.

13. The frame assembly, as set forth in claim 12, wherein the bottom sealant layer includes a sealant embedded within a substrate.

14. The frame assembly, as set forth in claim 13, where the bottom sealant layer is affixed to the inner frame by a plurality of fasteners.

15. The frame assembly, as set forth in claim 12, wherein the inner frame is composed from aluminum.

16. The frame assembly, as set forth in claim 12, further comprising adjusting means for allowing the connected first and second ends of adjacent sides to be adjusted.

17. The frame assembly, as set forth in claim 12, further comprising a plurality of adjusting mechanisms associated with each pair of connected first and second ends and being configured to allow the connected first and second ends of adjacent sides of the inner frame to be adjusted.

18. The frame assembly, as set forth in claim 17, wherein each of the adjusting mechanisms includes a bracket having a first bracket end a second bracket end, the first bracket end being coupled to the first end of one of the sides of the inner frame, the second bracket end being coupled to the second end of another one of the sides of the inner frame.

19. The frame assembly, as set forth in claim 18, wherein the first and second bracket ends of each bracket have at least one aperture, the bracket configured to be coupled to the sides of the inner frame by fasteners.

20. The frame assembly, as set forth in claim 19, wherein the apertures on at least one of the first and second bracket ends are slot-shaped to allow the connected side of the inner frame to be adjusted relative to the adjacent side.

* * * * *